United States Patent
Deng et al.

(10) Patent No.: US 11,840,667 B2
(45) Date of Patent: Dec. 12, 2023

(54) DEPOLYMERIZATION OF RECOVERED PLASTIC MATERIALS

(71) Applicants: Shuguang Deng, Mesa, AZ (US); Yixin Liu, Tempe, AZ (US); Kapil Chandra Akula, Scottsdale, AZ (US); Kodanda Phani Raj Dandamudi, Tempe, AZ (US)

(72) Inventors: Shuguang Deng, Mesa, AZ (US); Yixin Liu, Tempe, AZ (US); Kapil Chandra Akula, Scottsdale, AZ (US); Kodanda Phani Raj Dandamudi, Tempe, AZ (US)

(73) Assignee: ARIZONA BOARD OF REGENTS ON BEHALF OF ARIZONA STATE UNIVERSITY, Scottsdale, AZ (US)

( * ) Notice: Subject to any disclaimer, the term of this patent is extended or adjusted under 35 U.S.C. 154(b) by 0 days.

(21) Appl. No.: 17/859,644

(22) Filed: Jul. 7, 2022

(65) Prior Publication Data
US 2023/0022441 A1 Jan. 26, 2023

Related U.S. Application Data

(60) Provisional application No. 63/219,180, filed on Jul. 7, 2021.

(51) Int. Cl.
*C10G 1/10* (2006.01)
*C10G 1/00* (2006.01)
(Continued)

(52) U.S. Cl.
CPC .............. *C10G 1/10* (2013.01); *B01D 3/145* (2013.01); *B01D 53/229* (2013.01); *B01J 6/008* (2013.01);
(Continued)

(58) Field of Classification Search
None
See application file for complete search history.

(56) References Cited

U.S. PATENT DOCUMENTS

| | | | | |
|---|---|---|---|---|
| 2013/0118885 A1* | 5/2013 | Sarker | ...................... | C10B 53/07 201/8 |
| 2018/0245001 A1* | 8/2018 | Humphreys | ........... | C10G 31/10 |

OTHER PUBLICATIONS

Ahamed Kameel, N. I.; et al., Influence of reaction parameters on thermal liquefaction of plastic wastes into oil: A review. Energy Conversion and Management: X 2022, 14, 100196.
(Continued)

*Primary Examiner* — Youngsul Jeong
*Assistant Examiner* — Alyssa L Cepluch
(74) *Attorney, Agent, or Firm* — Michael Best & Friedrich LLP

(57) ABSTRACT

Described herein are systems and methods for the depolymerization of polyethylene-based plastics. In one embodiment, a method is disclosed that comprises combining a polyethylene-based plastic with a solvent in a reactor to generate a plastic solvent mixture, heating the plastic solvent mixture in the reactor, and fractionating the plastic solvent mixture into a gas phase product, a solid phase product, and a liquid phase product. In another embodiment, a system is disclosed that comprises a solvent, and a reactor configured to receive the polyethylene-based plastic and the solvent and convert the polyethylene-based plastic into a gas phase product, a solid phase product, and a liquid phase product, the reactor being configured to operate at a temperature greater than 275° C. and at a pressure greater than 2 megapascals.

18 Claims, 12 Drawing Sheets

(51) Int. Cl.
 B01J 6/00 (2006.01)
 B01D 3/14 (2006.01)
 B01D 53/22 (2006.01)
 C08J 11/08 (2006.01)
(52) U.S. Cl.
 CPC ............. C08J 11/08 (2013.01); C10G 1/002 (2013.01); C08J 2323/06 (2013.01); C10G 2300/1003 (2013.01)

(56) References Cited

OTHER PUBLICATIONS

Akram R, et al. Trends of electronic waste pollution and its impact on the global environment and ecosystem. Environmental Science and Pollution Research, 2019, 26:16923-16938.
Al-Salem SM, et al. A review on thermal and catalytic pyrolysis of plastic solid waste (PSW). Journal of Environmental Management, 2017, 197:177-198.
Anuar Sharuddin SD, et al, A review on pyrolysis of plastic wastes. Energy Conversion and Management, 2016, 115: 308-326.
Borrelle, S. B .; et al., Predicted growth in plastic waste exceeds efforts to mitigate plastic pollution. Science 2020, 369 (6510), 1515.
Chandrasekaran S R, et al. Materials and energy recovery from e-waste plastics. ACS Sustainable Chemical Engineering, 2018, 6: 4594-4602.
Channiwala, S. A.; et al., A unified correlation for estimating HHV of solid, liquid and gaseous fuels. Fuel 2002, 81 (8), 1051-1063.
Chen WT, et al, Use of supercritical water for the liquefaction of polypropylene into oil. ACS Sustainable Chemical Engineering, 2019, 7: 3749-3758.
Chen, W.-T.; et al., Effect of ash on hydrothermal liquefaction of high-ash content algal biomass. Algal research 2017, 25, 297-306.
Cheng, L.; et al., Polyethylene high-pressure pyrolysis: Better product distribution and process mechanism analysis. Chemical Engineering Journal 2020, 385, 123866.
Ciuffi, B.; et al., Towards a better understanding of the HTL process of lignin-rich feedstock. 2021, 11 (1), 1-9.
Datta J, et al. Thermo-chemical decomposition study of polyurethane elastomer through glycerolysis route with using crude and refined glycerine as a transesterification agent. Journal of Polymers and the Environment, 2018, 26: 166-174.
Dimitriadis A, et al, Hydrothermal liquefaction of various biomass and waste feedstocks for biocrude production: A state of the art review. Renewable and Sustainable Energy Reviews, 2017, 68: 113-125.
Dos Passos, J. S.; et al., Screening of common synthetic polymers for depolymerization by subcritical hydrothermal liquefaction. Process Safety and Environmental Protection 2020, 139, 371-379.
EPA, Advancing Sustainable Materials Management 2013 Fact Sheet. United States Environmental Protection Agency Washington, DC, USA: 2015 (22 pages).
EPA, Advancing Sustainable Materials Management 2015 Fact Sheet. United States Environmental Protection Agency Washington, DC, USA: 2018 (23 pages).
Fakhroleslam, M.; et al, Thermal/catalytic cracking of hydrocarbons for the production of olefins; a state-of-the-art review III: Process modeling and simulation. Fuel 2019, 252, 553-566.
Garcia J M, et al. The future of plastics recycling: Chemical advances are increasing the proportion of polymer waste that can be recycled. Science, 2017, 358: 870-872.
Goto, M.; et al., Reactions of polymers in supercritical fluids for chemical recycling of waste plastics. 2006, 41 (5), 1509-1515.
Grilc, M.; et al., Kinetic model of homogeneous lignocellulosic biomass solvolysis in glycerol and imidazolium-based ionic liquids with subsequent heterogeneous hydrodeoxygenation over NiMo/Al2O3 catalyst. Catalysis today 2015, 256, 302-314.
Guan, Q.; et al., Preparation of ethyl levulinate from wheat straw catalysed by sulfonate ionic liquid. Industrial Crops and Products 2018, 113, 150-156.
Hamad K, et al. Recycling of waste from polymer materials: an overview of the recent works. Polymer Degradation and Stability, 2013, 98:2801-2812.
Helmer Pedersen, T.; et al., Improving the circular economy via hydrothermal processing of high-density waste plastics. Waste Management 2017, 68, 24-31.
Hwang, G. C.; et al., Degradation of high density polyethylene, polypropylene and their mixtures in supercritical acetone. 2001, 18 (3), 396-401.
Jan MR, et al. Catalytic degradation of waste high-density polyethylene into fuel products using BaCO3 as a catalyst. Fuel Processing Technology, 2010, 91: 1428-1437.
Jin, H.; et al., Hydrothermal Liquefaction of Polycarbonate (PC) Plastics in Sub-/Supercritical Water and Reaction Pathway Exploration. ACS Sustainable Chemistry & Engineering 2020, 8 (18), 7039-7050.
Jin, K.; et al., Conversion of polyethylene waste into clean fuels and waxes via hydrothermal processing (HTP). Fuel 2020, 273, 117726.
Kamal, D. M.; et al., Green product of liquid fuel from plastic waste by pyrolysis at 900° C. Journal of Energy and Power Engineering 2015, 9, 40-44.
Kumari, A.; et al., Pyrolytic degradation of polyethylene in autoclave under high pressure to obtain fuel. Journal of Analytical and Applied Pyrolysis 2017, 124, 298-302.
Kunwar, B.; et al., Catalytic and thermal depolymerization of low value post-consumer high density polyethylene plastic. Energy 2016, 111, 884-892.
Lai, J.-Q.; et al., Enzymatic production of microalgal biodiesel in ionic liquid [BMIm][PF6]. Fuel 2012, 95, 329-333.
Lettieri, P.; et al. In Thermochemical treatment of plastic solid waste, Waste, Elsevier: 2011; pp. 233-242.
Levine, A. G., 125 questions: Exploration and discovery. Sanders, S., Ed. Science: American, 2021; p. 40. https://www.science.org/content/resource/125-questions-exploration-and-discovery (accessed May 14, 2021).
Li, Q.; et al., Efficient hydro-liquefaction of woody biomass over ionic liquid nickel based catalyst. Industrial Crops and Products 2018, 113, 157-166.
Li, Y.; et al. In DC Breakdown Characteristics of LLDPE-based XLPE with Different Crosslinking Degrees, 2018 Condition Monitoring and Diagnosis (CMD), IEEE: 2018; pp. 1-4.
Liu, Y., et al. "Effective depolymerization of polyethylene plastic wastes under hydrothermal and solvothermal liquefaction conditions." Chemical Engineering Journal (2022): 137238.
Lopez G, et al. Recent advances in the gasification of waste plastics. A critical overview. Renewable and Sustainable Energy Reviews, 2018, 82: 576-596.
Mahesh, D.; et al., Hydrothermal liquefaction of municipal solid wastes for high quality bio-crude production using glycerol as co-solvent. Bioresource Technology 2021, 339, 125537.
Miandad R, et al. Catalytic pyrolysis of plastic waste: A review. Process Safety and Environmental Protection, 2016, 102: 822-838.
Miandad, R.; et al., Effect of plastic waste types on pyrolysis liquid oil. International biodeterioration & biodegradation 2017, 119, 239-252.
Moriya, T.; et al.; Stability, Characteristics of polyethylene cracking in supercritical water compared to thermal cracking. Polymer Degradation 1999, 65 (3), 373-386.
Munir D, et al. Hydrocracking of virgin and waste plastics: A detailed review. Renewable and Sustainable Energy Reviews, 2018, 90: 490-515.
Niu, B.; et al., Engineering, Recovery of tantalum from waste tantalum capacitors by supercritical water treatment. ACS Sustainable Chemistry & Engineering 2017, 5 (5), 4421-4428.
Nizami, A.; et al., Developing waste biorefinery in Makkah: a way forward to convert urban waste into renewable energy. Applied Energy 2017, 186, 189-196.
Nkosi, N.; et al., Developments in waste tyre thermochemical conversion processes: gasification, pyrolysis and liquefaction. RSC Advances 2021, 11 (20), 11844-11871.

(56) References Cited

OTHER PUBLICATIONS

Okajima, I.; et al., Chemical recycling of carbon fiber reinforced plastic using supercritical methanol. 2014, 91, 68-76.
Okajima, I.; et al., Chemical recycling of carbon fiber reinforced plastic with supercritical alcohol. 2012, 3 (2), 1-4.
Passamonti FJ, et al. Recycling of waste plastics into fuels. LDPE Convers FCC. Applied Catalysis, B Environmental, 2012, 125:499-506.
Perkins G, et al, Recent advances in liquefaction technologies for production of liquid hydrocarbon fuels from biomass and carbonaceous wastes. Renewable and Sustainable Energy Reviews, 2019, 115: 109400.
Piñero-Hernanz, R.; et al., Chemical recycling of carbon fibre composites using alcohols under subcritical and supercritical conditions. The Journal of Supercritical Fluids 2008, 46 (1), 83-92.
Radhakrishnan, R.; et al., Recent advancements in the ionic liquid mediated lignin valorization for the production of renewable materials and value-added chemicals. Renewable and Sustainable Energy Reviews 2021, 149, 111368.
Rice, F., The thermal decomposition of organic compounds from the standpoint of free radicals. I. Saturated hydrocarbons. Journal of the American Chemical Society 1931, 53 (5), 1959-1972.
Roberts, V. M.; et al., Towards quantitative catalytic lignin depolymerization. 2011, 17 (21), 5939-5948.
Serrano, D.; et al., An investigation into the catalytic cracking of LDPE using Py-GC/MS. Journal of analytical and applied pyrolysis 2005, 74 (1-2), 370-378.
Seshasayee, M. S.; et al., Oil from plastic via hydrothermal liquefaction: Production and characterization. Applied Energy 2020, 278, 115673.
Sharuddin, S. D. A.; et al.; management, A review on pyrolysis of plastic wastes. Energy conversion 2016, 115, 308-326.
Shi, S., Advances in modeling hydrocarbon cracking kinetic predictions by quantum chemical theory: A review. International Journal of Energy Research 2018, 42 (10), 3164-3181.
Singh N, et al. Recycling of plastic solid waste: A state of art review and future applications. Composites, Part B 2017, 115: 409-422.
Singh, B.; et al., Mechanistic implications of plastic degradation. Polymer Degradation and Stability 2008, 93 (3), 561-584.
Singh, S. K.; et al., Ionic liquids catalyzed lignin liquefaction: mechanistic studies using TPO-MS, FT-IR, RAMAN and 1D, 2D-HSQC/NOSEY NMR. Green Chemistry 2016, 18 (14), 4098-4108.
Su, X.; et al., Investigation on degradation of polyethylene to oils in supercritical water. Fuel Processing Technology 2004, 85 (8), 1249-1258.

Sun PQ, et al. Direct liquefaction of paulownia in hot compressed water: influence of catalysts. Energy, 2010, 35:5421-5429.
Syamsiro, M.; et al., Fuel oil production from municipal plastic wastes in sequential pyrolysis and catalytic reforming reactors. Energy Procedia 2014, 47, 180-188.
Uddin, M. A.; et al., Thermal and catalytic degradation of structurally different types of polyethylene into fuel oil. Polymer Degradation and Stability 1997, 56 (1), 37-44.
US Energy Information Administration . Office of Energy Statistics, U. D. o. E. W., Jan. 2019 Monthly energy review. 2019.
Verma, R.; et al., Toxic pollutants from plastic waste—a review. Procedia Environmental Sciences 2016, 35, 701-708.
Wang, Y.; et al., Degradation of brominated flame retardant in computer housing plastic by supercritical fluids. Journal of Hazardous Materials 2012, 205-206, 156-163.
Wang; et al., Hydrothermal liquefaction of wheat straw in subcritical water/ethanol with ionic liquid for bio-oil. China Petroleum Processing & Petrochemical Technology 2015, 17 (4), 81.
Watanabe, M.; et al., Polyethylene conversion in supercritical water. 1998, 13 (1-3), 247-252.
Watson J, et al. Valorization of hydrothermal liquefaction aqueous phase: pathways towards commercial viability. Progress in Energy and Combustion Science, 2020, 77 : 100819.
Yang X, et al. Pyrolysis and dehalogenation of plastics from waste electrical and electronic equipment (WEEE): a review. Waste Management, 2013, 33: 462-473.
Yong, T. L.-K.; et al., Kinetic Analysis of Lignin Hydrothermal Conversion in Sub- and Supercritical Water. Industrial & Engineering Chemistry Research 2013, 52 (16), 5626-5639.
Zeng X, et al. Urban Mining of e-waste is becoming more cost-effective than virgin mining. Environmental Science & Technology, 2018, 52: 4835-4841.
Zhang, Y.; et al., Jet fuel production from waste plastics via catalytic pyrolysis with activated carbons. Applied Energy 2019, 251, 113337.
Zhao XY, et al. Hydrothermal treatment of e-waste plastics for tertiary recycling: product slate and decomposition mechanisms. ACS Sustainable Chemical Engineering, 2019, 7: 1464-1473.
Zhao, P.; et al., Product Characteristics and Synergy Study on Supercritical Methanol Liquefaction of Lignocellulosic Biomass and Plastic. ACS Sustainable Chemistry & Engineering 2021, 9 (50), 17103-17111.
Zhao, P.; et al., Supercritical water co-liquefaction of LLDPE and PP into oil: properties and synergy. Sustainable Energy & Fuels 2021, 5 (2), 575-583.
Zong, R.; et al., Thermal degradation kinetics of polyethylene and silane-crosslinked polyethylene. Journal of applied polymer science 2005, 98 (3), 1172-1179.

* cited by examiner

Product yield with different solvents

| Solvent | SRP : Solvent | Temperature, °C | Residence time, min | Oil Yield, % | Solid Yield, % | Gas Yield, % |
|---|---|---|---|---|---|---|
| Water | 1:16 | 350 | 90 | 0.49358342 | 98.91411649 | 0.5923001 |
| Methanol | 1:6 | 350 | 90 | 11.995 | 32.567 | 55.438 |
| Ethanol | 1:6 | 350 | 90 | 20.895 | 38.714 | 40.391 |
| Isopropyl alcohol | 1:6 | 350 | 90 | 18.356 | 42.136 | 39.508 |
| Acetone | 1:6 | 350 | 90 | 40.75 | 25.24 | 34.01 |

SRP reaction with solvent @ 350 °C, 90 min and 6g:30ml SRP:Solvent (w/v)

*FIG. 3*

Product yield with different reaction times (acetone)

| Residence time, min | Oil Yield, % | Solid Yield, % | Gas Yield, % | HHV |
|---|---|---|---|---|
| 30 min | 22.557±2.232 | 49.706±4.272 | 27.737±3.828 | 44.1495 |
| 60 min | 40.095±6.637 | 33.387±7.972 | 26.518±1.174 | 43.8809 |
| 90 min | 40.055±1.628 | 24.659±0.822 | 35.286±2.296 | 43.8295 |
| 120 min | 41.017±0.317 | 26.596±6.390 | 32.387±6.345 | 44.2220 |

FIG. 5

Product yield with acetone as solvent

| Number | SRP : Acetone | Temperature, °C | Residence time, min | Oil Yield, % | Solid Yield, % | Gas Yield, % |
|---|---|---|---|---|---|---|
| #L24 | 1:6 | 350 | 30 | 20.172 | 50.090 | 29.738 |
| #L33 | 1:6 | 350 | 30 | 27.049 | 33.527 | 39.424 |
| #L36 | 1:6 | 350 | 30 | 24.595 | 45.255 | 30.150 |
| #L41 | 1:6 | 350 | 30 | 22.903 | 53.774 | 23.323 |
| #L23 | 1:6 | 350 | 60 | 45.702 | 27.749 | 26.549 |
| #L32 | 1:6 | 350 | 60 | 32.767 | 39.024 | 28.209 |
| #L39 | 1:6 | 350 | 60 | 41.815 | 53.848 | 4.337 |
| #L25 | 1:6 | 350 | 90 | 40.375 | 25.24 | 34.385 |
| #31 | 1:6 | 350 | 90 | 38.291 | 24.077 | 37.632 |
| #L38 | 1:6 | 350 | 90 | 41.499 | 48.551 | 9.950 |
| #L22 | 1:6 | 350 | 120 | 41.374 | 27.037 | 31.589 |
| #L34 | 1:6 | 350 | 120 | 40.911 | 19.996 | 39.093 |
| #L35 | 1:6 | 350 | 120 | 40.767 | 32.754 | 26.479 |

SRP reaction with Acetone @ 350 °C, and 6g : 30ml for SRP : Solvent(w/v)

*FIG. 6*

DEPOLYMERIZATION OF RECOVERED PLASTIC MATERIALS

CROSS-REFERENCE TO RELATED APPLICATIONS

The present application claims priority to U.S. provisional patent application No. 63/219,180, filed Jul. 7, 2021, the disclosure of which is hereby incorporated by reference in its entirety.

FIELD OF DISCLOSURE

The present disclosure relates to polyethylene-based plastics and the materials, methods, systems, and techniques for their depolymerization. More specifically, the present disclosure relates to methods and systems comprising solvents, catalysts, and reactors for the depolymerization and conversion of polyethylene-based plastics into re-usable gas, liquid, and solid phase products.

INTRODUCTION

Consumption of plastic is readily increasing due to various advantages coming from versatility, low cost, and high chemical stability. Global plastics production surged from 15 million tons in 1964 to above 300 million tons in 2017. Meanwhile, more and more plastic products are being used in electronic and electrical equipment to replace metal, attributed to the unique electrical insulating properties of plastics and their strength, stress resistance, flexibility, and durability. However, the frequent updates of electronic and electrical equipment have made e-waste a fast-growing waste stream over the world, of which waste plastics are important parts, accounting for about 30% of the total amount of e-waste. About 280 million tons of polymers are produced globally per year, of which 20-50 million tons become e-waste, comprising more than 5% of all municipal solid wastes. The recycling of e-waste plastics is not only beneficial for the reduction of pollutants, but also in favor of energy and materials recovery and sustainability of our society. Polyethylene-based plastics are currently discarded in landfills and are not usually recycled because this type of polymer is very resistant to depolymerization due to the stable carbon-carbon bonds.

SUMMARY

Materials, methods, systems, and techniques disclosed and contemplated herein relate to the depolymerization of polyethylene-based plastics. The methods and systems disclosed herein may result in an improved conversion of polyethylene-based plastics into gaseous and liquid phase products, which may then be recycled for use in other applications.

In one embodiment, a method for depolymerizing a polyethylene-based plastic is disclosed. The method comprises combining the polyethylene-based plastic with a solvent in a reactor to generate a plastic solvent mixture; heating the plastic solvent mixture in the reactor; and fractionating the plastic solvent mixture into a gas phase product, a solid phase product, and a liquid phase product.

In another embodiment, a system for depolymerizing a polyethylene-based plastic is disclosed. The system comprises a solvent; and a reactor configured to receive the polyethylene-based plastic and the solvent and convert the polyethylene-based plastic into a gas phase product, a solid phase product, and a liquid phase product; wherein the reactor is configured to operate at a temperature greater than 275° C. and at a pressure greater than 2 megapascals.

In another embodiment, a method for depolymerizing a polyethylene-based plastic is disclosed. The method comprises combining the polyethylene-based plastic with a solvent in a reactor to generate a plastic solvent mixture; heating the plastic solvent mixture in the reactor at a temperature greater than 275° C. and at a pressure greater than 2 megapascals; fractionating the plastic solvent mixture into a gas phase product, a solid phase product, and a liquid phase product; and processing the gas phase product and the liquid phase product using a membrane and adsorption hybrid process.

Other aspects of the disclosure will become apparent by consideration of the detailed description and accompanying drawings. There is no specific requirement that a material, method, or technique all of the details characterized herein, in order to obtain some benefit according to the present disclosure. Thus, the specific examples characterized are meant to be exemplary applications of the techniques described, and alternatives are possible.

BRIEF DESCRIPTION OF THE DRAWINGS

FIG. 3 is a table showing gas, solid, and oil product yields with different solvent types at 350° C. for a reaction time of 90 min.

FIG. 5 is a table showing gas, solid, and oil product yields with different residence (reaction) times at 350° C. using acetone as the solvent.

FIG. 6 is a table showing gas, solid, and oil product yields with different residence (reaction) times at 350° C. using acetone as the solvent with a SRP plastic:acetone (w/v) ratio of 1:6.

DETAILED DESCRIPTION

Figure 1:
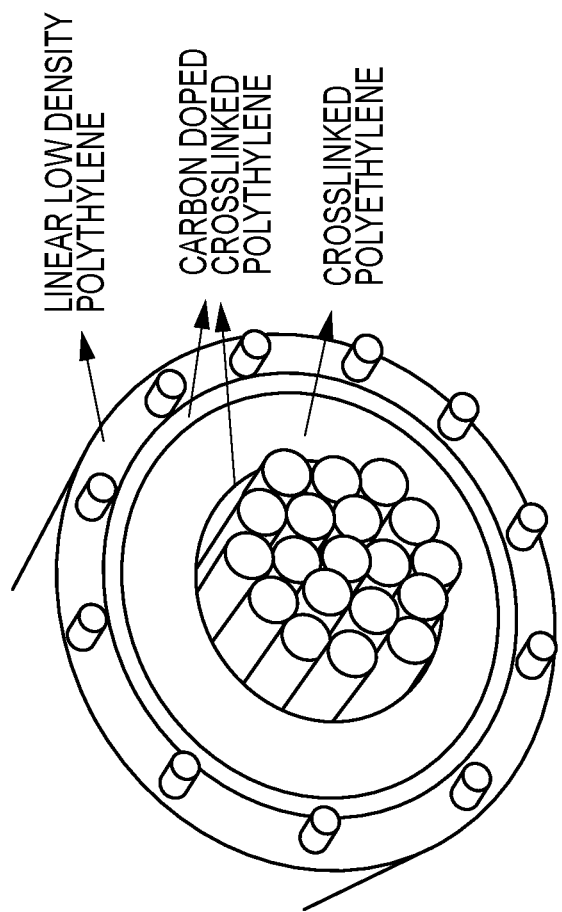
FIG. 1 is a cross-sectional graphic showing the structure of an exemplary SRP (Salt River Project) plastic.
Figure 1:
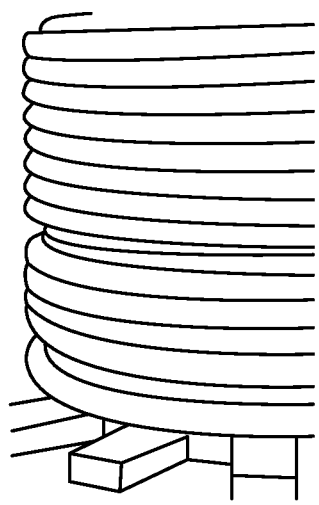
Figure 2:
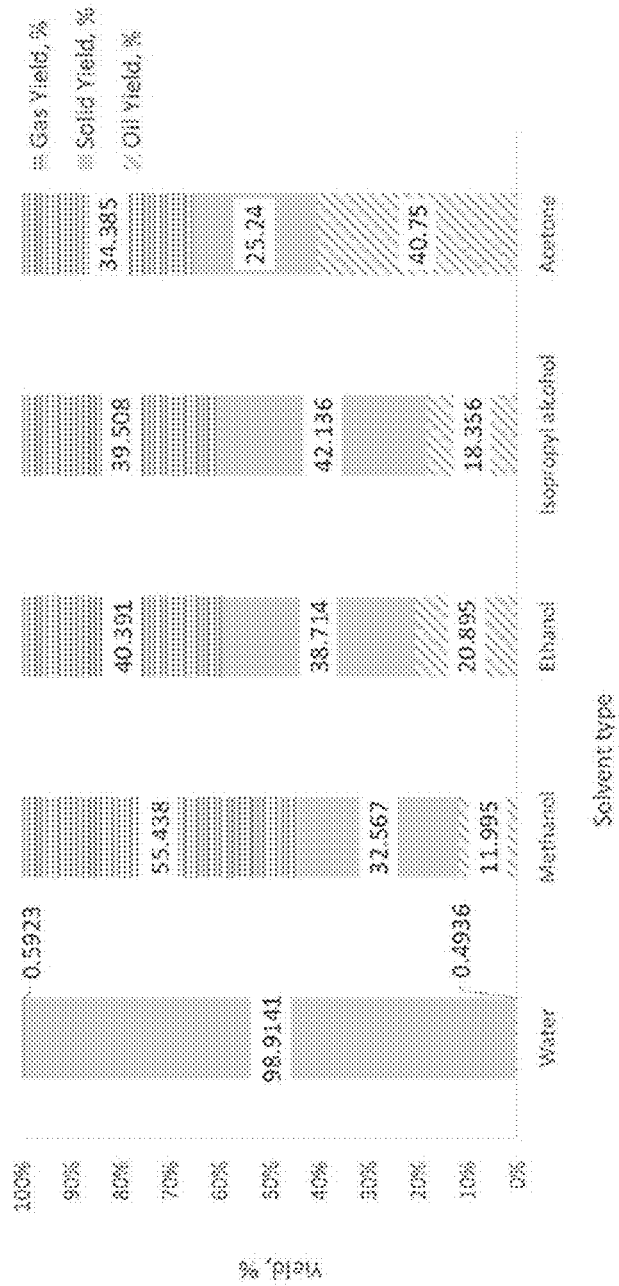
FIG. 2 is a graph showing gas, solid, and oil product yields with different solvent types at 350° C. for a reaction time of 90 min.
Figure 4:
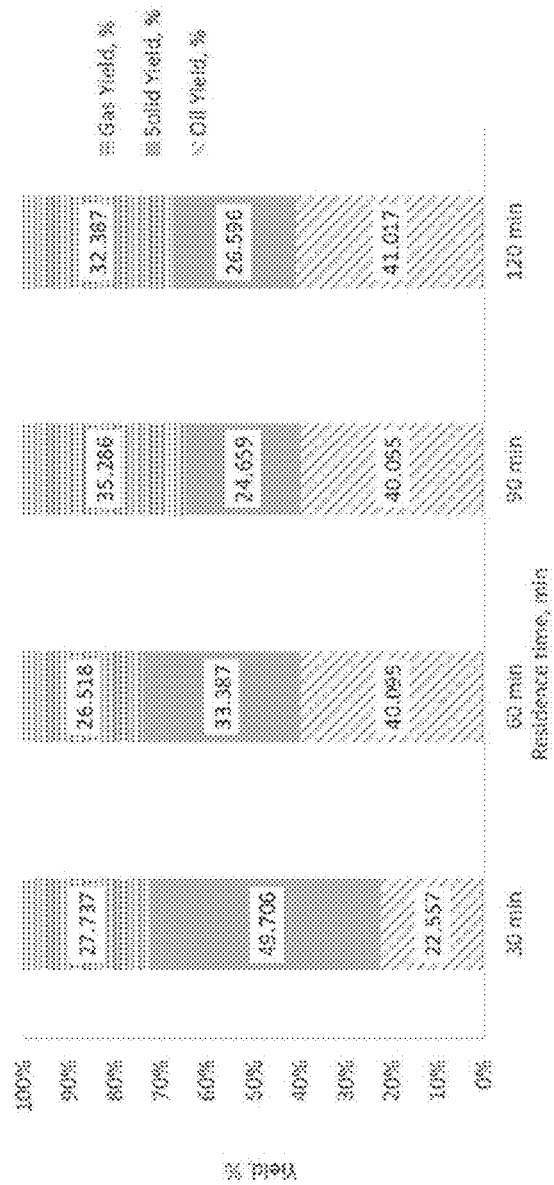
FIG. 4 is a graph showing gas, solid, and oil product yields with different residence (reaction) times at 350° C. using acetone as the solvent.

Unless otherwise defined, all technical and scientific terms used herein have the same meaning as commonly understood by one of ordinary skill in the art. In case of conflict, the present disclosure, including definitions, will control.

As used herein, the terms such as "include," "including," "contain," "containing," "having," and the like mean "comprising." The present disclosure also contemplates other embodiments "comprising," "consisting of," and "consisting essentially of," the embodiments or elements presented herein, whether explicitly set forth or not.

As used herein, the term "about" or "approximately" as applied to one or more values of interest, refers to a value that is similar to a stated reference value, or within an acceptable error range for the particular value as determined by one of ordinary skill in the art, which will depend in part on how the value is measured or determined, such as the limitations of the measurement system. In one aspect, the term "about" refers to any values, including both integers and fractional components that are within a variation of up to ±10% of the value modified by the term "about." Alternatively, "about" can mean within 3 or more standard deviations, per the practice in the art.

All ranges disclosed herein include both end points as discrete values as well as all integers and fractions specified within the range. For example, a range of 0.1-2.0 includes 0.1, 0.2, 0.3, 0.4 . . . 2.0. If the end points are modified by the term "about," the range specified is expanded by a variation of up to ±10% of any value within the range or within 3 or more standard deviations, including the end points.

Materials, methods, systems, and techniques disclosed and contemplated herein relate to the depolymerization of recovered plastic materials, including e-waste plastics. Exemplary components of e-waste plastics are high-impact polystyrene (HIPS), acrylonitrile butadiene styrene (ABS), polycarbonate (PC), ethylene-propylene rubber (EPR), and polyvinyl chloride (PVC). Not only is plastic waste residing in landfills harmful to the environment, but it also represents missed economic opportunities.

Current recycling approaches of waste plastics mainly include primary recycling, secondary recycling, energy recovery, and tertiary recycling. Both primary recycling and secondary recycling are coupled with mechanical means and apply to clean or semi-clean single-polymer plastics, which are the widely adopted technology for large-scale treatment of plastic solid wastes. Energy recovery is carried out by incinerating waste plastics to achieve the purpose of volume reduction and heat recovery. However, the incineration of waste plastics without pretreatment will lead to the emission of air pollutants such as volatile organic compounds (VOCs), smoke, polycyclic aromatic hydrocarbons (PAHs), polychlorinated dibenzofurans (PCDFs), and dioxins. Tertiary recycling is considered as the advanced technology processes (chemical or thermochemical means), which convert polymer materials into petrochemicals, monomer feedstock, or biocrude. Due to the energy sustainability and economical principle, tertiary recycling is gaining more and more remarkable attention around the world.

Several tertiary recycling techniques (e.g., gasification, hydrogenation, pyrolysis, catalytic pyrolysis, and hydrothermal liquefaction) have been investigated. Gasification is a thermolysis technology that converts waste plastics into mixed combustible gas such as CO and $H_2$ in the presence of a gasification agent ($O_2$ or air). Even though it is considered a flexible process, it renders a gaseous product that needs to be converted to fuel via an auxiliary process such as Fischer-Tropsch synthesis. Hydrogenation of plastic generally occurs at about 400° C. and 2-15 megapascals (MPa) hydrogen pressures for the conversion of heavy plastic molecules to liquid fuels of low boiling molecules.

Pyrolysis is a quick thermochemical treatment technique to destroy plastic structures and turn them into fuels and chemical products, which has been extensively investigated as a viable route of recycling for the cases of the single or the mixture of plastics in a fluidized bed reactor. On the basis of the conventional pyrolysis, catalytic pyrolysis was developed over the catalysts such as zeolites, acid, or nonacid mesoporous materials, FCC catalysts, metallic oxide, etc., to reduce the difficulty of the reaction and increase the target products. For the pyrolysis process, however, feedstock drying is required, and the reaction is carried out at high temperatures (450-800° C.); furthermore, it has low oil yields without catalysts, and the oil produced needs upgrading for fuel applications, resulting in a high processing cost.

Hydrothermal liquefaction (HTL) is an alternative thermochemical technology for the conversion of biomass into biocrude, which breaks down the polymer structure into liquid components within a temperature range of 250-450° C., and a pressure range of 4-22 MPa with the presence of a solvent in order to form a highly reactive environment. The reactions that take place during HTL are decomposition and repolymerization forming biocrude, aqueous dissolved chemicals, solid residue, and gas. High pressure helps solvent, which in most cases is water, to remain in the liquid state, while the combination of high pressure and temperature results in decreasing its dielectric constant and density, forcing hydrocarbons to become more water-soluble. In addition to that, the polarity of water molecules decreases, as a result of a more evenly shared electron between the oxygen and hydrogen atoms. The increasing dissociation of water into H+ and OH− ions suggests that the hot-compressed water is a good medium for acid- or base-catalyzed reactions. Compared with pyrolysis, feedstock drying in the case of HTL is not necessary which reduces the economic return of fuel production to a great extent due to the wet nature of the selected feeds. Furthermore, the solvents employed for HTL can render higher quality products as compared to those obtained from pyrolysis. Finally, the HTL product has lower oxygen and moisture content and higher heating value in comparison to the pyrolysis product which reduces both the fixed and operative costs of handling equipment and storage, rendering the HTL technology more competitive for the conversion of woody biomass, agricultural waste and microalgae into value-added products.

From a techno-economic perspective, although there are many key factors affecting the production cost, HTL for renewable fuels or chemicals is still promising and highly cost competitive to other processes. However, the HTL of e-waste plastics as one feasible advanced technology of tertiary recycling is rarely focused on by scholars, and the knowledge generated is rather fragmentary. Under subcritical or supercritical conditions, water acts as a key ingredient with significant changes in physical and chemical properties, which has tremendous amounts of energy and may destroy the carbon-carbon bond of organic components. Meanwhile, a series of hydrothermal cracking, hydrolysis, free radical reaction, nucleophilic substitution, and cyclization reactions occurs in the reaction medium that converts the waste plastics matrix into monomers or chemical feedstock. More advantageous is that HTL may receive unsorted mixed and organic contaminated plastics, which eliminates the sorting step and greatly improves the recovery efficiency and economic benefit of the plastic recovery. In an airtight anaerobic atmosphere, even halogen-containing e-waste plastics do not produce carcinogens such as dioxins and furans released into the air during hydrothermal treatment. Therefore, HTL of e-waste plastics aims at forming a green and sustainable closed-loop recycling way.

The conversion of model polypropylene into oil using the HTL technology in supercritical water at 380-500° C. and 23 MPa over a reaction time of 0.5-6 hr was previously studied, and the reaction pathways for converting model polypropylene into oil under the tested conditions were proposed. Up to 91 wt % of model polypropylene was converted into oil at 425° C. with a 2-4 hr reaction time or at 450° C. with a 0.5-1 hr reaction time. The oil products included olefins, paraffins, cyclics, and aromatics. About 80-90 wt % of the oil components had the same boiling point range as naphtha (25-200° C.) and heating values of 48-49 MJ/kg. Preliminary analyses indicate that this conversion process is net-energy positive and potentially has higher energy efficiency and lower greenhouse gas emissions than incineration and mechanical recycling. The HTL technology has previously been implemented to convert the e-waste plastics into organic products which can be used as monomers of plastic production or chemical feedstock. The recovery efficiencies of organic products, the product slate, the possible hydrothermal degradation mechanisms, and the microstructure of solid residues were systematically investigated. The results showed that the yields of organic products derived from four kinds of e-waste plastics ranged from 81.4 wt % to 97.6 wt % at 350° C. On the basis of the systematic analysis of hydrothermal organic products, the possible degradation mechanisms were proposed which involved a variety of reactions such as depolymerization, hydrothermal cracking, hydrolysis, nucleophilic substitution, and free radical reaction.

According to previous reports on biomass HTL, there are some cases where the use of catalysts was indicated as a factor that could increase the biocrude yields. Employing different catalysts could change the distribution and relative abundance of produced compounds, and the choice of catalyst depends on the feedstock employed. The role of a catalyst is mainly to suppress the formation of char, while enhancing the yield of liquid products. Moreover, catalysts reduce the condensation and/or repolymerization reactions of the intermediate products formed by the decomposition of lignin, leading to higher biocrude and a lower solid residue yield. In general, zeolites are promising catalysts for improving the properties of crude bio-oil from the HTL of biomass and microalgae due to their strong site acidity and proper pore structure for aromatization. The ionic liquid is a new type of catalyst, due to its solvation characteristic and catalytic effect, it has been widely used in biomass HTL research, offering an advantage to develop such methods under milder conditions. However, few experimental studies have been published on the application of catalysts in the HTL of e-waste plastics for crude oil production.

Organic solvents such as methanol, ethanol, and others may be included in HTL systems to replace water, creating a solvothermal liquefaction (STL) system that can improve the solvent properties of the HTL system, effectively reduce the liquefaction temperature of biomass, and improve the conversion. Methanol has excellent solvent properties and has shown to be a good prospect in the research of thermochemical recovery of polyethylene terephthalate, nylon 6, carbon fiber reinforced plastic, phenol resin, fiber-reinforced, and lignin. Acetone is also believed to be a good solvent for plastic degradation, and it has been proposed that supercritical acetone thermal liquefaction could obtain high oil yield at lower temperatures. Although STL shows excellent polymer degradation performance and the variety of organic solvents provides great selectivity, the polarity and functional groups of the solvents are various, leading to diverse reaction mechanisms.

Most previous work on plastics recycling has been concentrated on the deconstruction of the polymer materials and applications of the recovered chemicals and monomers in the biocrude oil phase. Due to the chemical stability and inertness of the plastic materials, complete depolymerization of plastic material is hardly achieved. There are currently no reports on the application of unconverted or partially converted plastic materials. This issue may be addressed by exploring the application of partially converted solid residues as additives to road pavement and substrates for synthesizing porous carbons that have a much higher value than solid fuels.

Disclosed herein are techniques for the depolymerization of polyethylene-based plastics into small molecules that may be separated and valorized, which represents a breakthrough in the deconstruction of polyethylene polymers. Under certain exemplary process conditions, greater than 70% of plastic samples, which include linear low-density polyethylene (LLDPE), crosslinked polyethylene (XLPE), and carbon-doped crosslinked polyethylene, may be converted into gaseous and liquid products. All of the products (gas, liquid, and solid) may be recovered, separated, and reused for various other applications.

I. Example Depolymerization Systems and Methods

Depolymerization systems and methods described and contemplated herein may be characterized, for instance, by the conversion of polyethylene-based plastics into gaseous and liquid phase products. Various polyethylene-based plastics, solvents, catalysts, reactors, and reactor conditions may be used in the methods, systems, and techniques described herein, and exemplary embodiments are provided below.

A. Polyethylene-Based Plastics

As used herein, a "polyethylene-based plastic" is a plastic that is primarily comprised of polyethylene polymer material. Exemplary polyethylene-based plastics are capable of being depolymerized and converted into gas, liquid, and solid phase products by the methods, systems, and techniques described herein. In some aspects of the instant disclosure, polyethylene-based plastic materials may be recovered from the insulators of discarded electrical cables.

Exemplary polyethylene-based plastics may include linear low-density polyethylene (LLDPE), low-density polyethylene (LDPE), medium-density polyethylene (MDPE), high-density polyethylene (HDPE), very-low-density polyethylene (VLDPE), ultra-high-molecular-weight polyethylene (UHMWPE), ultra-low-molecular-weight polyethylene (ULMWPE), high-molecular-weight polyethylene (HMWPE), crosslinked polyethylene (XLPE), carbon-doped crosslinked polyethylene, or combinations thereof.

An example plastic structure having various types of polyethylene-based plastic is shown in FIG. 1, where SRP (Salt River Project power and water in Arizona) plastic comprises LLDPE, XLPE, and carbon-doped crosslinked polyethylene.

B. Solvents

As used herein, a "solvent" is a liquid medium capable of being used in the disclosed liquefaction systems and methods to depolymerize a polyethylene-based plastic. The liquefaction systems and methods involve a solvent reacting with a polyethylene-based plastic under high temperatures and pressures to break down the polymer structure and convert the plastic into liquid, gas, and solid phase products. In some aspects of the disclosed invention, hydrothermal liquefaction (HTL) systems and methods are described that use water as the solvent. In other aspects, solvothermal liquefaction (STL) systems and methods are described that use at least one organic solvent as the solvent.

Exemplary solvents may include at least one of water, methanol, ethanol, butanol, isopropyl alcohol, acetone, or other organic solvents known in the art.

In some aspects, a polyethylene-based plastic is combined with a solvent at a solid-liquid weight/volume ratio of about 1 gram plastic:6 mL solvent to about 1 gram plastic:20 mL solvent. In one non-limiting exemplary embodiment, 5 g of a polyethylene-based plastic is combined with 30 mL of a solvent (1:6 solid-liquid ratio) and added to a 100 mL reactor. In other non-limiting exemplary embodiments, solid-liquid ratios of 1:13, 1:16, 1:18, and 1:20 are employed.

C. Catalysts

As used herein, a "catalyst" is a compound that may be combined with a solvent of the disclosed systems and methods and that may be capable of reducing the condensation and/or repolymerization reactions of the intermediate products formed in the depolymerization reactions. Liquefaction systems and methods described herein may include the use of one or more catalysts that may suppress the formation of char and enhance the yield of liquid phase products such as oil. The particular catalyst that is used will generally depend on the plastic feedstock and specific solvent being employed.

Exemplary catalysts may include zeolites due to their strong site acidity and proper pore structure for aromatization. Exemplary catalysts may also include acidic or basic compounds. Exemplary catalysts may also include ionic liquid compounds. Ionic liquids include salts in the liquid state that are primarily made of ions. These ionic liquid compounds may be referred to as liquid electrolytes, ionic melts, ionic fluids, fused salts, liquid salts, or ionic glasses.

Exemplary catalysts may include HCl, $H_2SO_4$, 1-butyl-3-methylimidazolium bis[(perfluoroethyl)sulfonyl]-imide ([BMIM][PF2]), 1-butyl-3-methylimidazolium tetrafluoroborate ([BMIM][BF4]), 1-butyl-3-methylimidazolium hexafluorophosphate ([BMIM][PF6]), or combinations thereof.

In some aspects, one or more catalysts may be combined with a plastic solvent mixture at about 0.5 wt % to about 5 wt % of the total solvent volume. In various instances, one or more catalysts may be combined with a plastic solvent mixture at greater than 0.5 wt %; greater than 1.0 wt %; greater than 1.5 wt %; greater than 2.0 wt %; greater than 2.5 wt %; greater than 3.0 wt %; greater than 3.5 wt %; greater than 4.0 wt %; or greater than 4.5 wt %. In various instances, one or more catalysts may be combined with a plastic solvent mixture at less than 5.0 wt %; less than 4.5 wt %; less than 4.0 wt %; less than 3.5 wt %; less than 3.0 wt %; less than 2.5 wt %; less than 2.0 wt %; less than 1.5 wt %; or less than 1.0 wt %. In various instances, one or more catalysts may be combined with a plastic solvent mixture between 0.5 wt % and 5.0 wt %; between 0.5 wt % and 2.5 wt %; between 2.5 wt % and 5.0 wt %; between 0.5 wt % and 2.0 wt %; between 1.0 wt % and 3.0 wt %; between 2.0 wt % and 4.0 wt %; or between 3.0 wt % and 5.0 wt %.

D. Reactor Conditions

Exemplary systems and methods include reactors for performing the depolymerization of polyethylene-based plastics. Disclosed reactors are capable of operating under high temperatures and pressures for extended periods of time. In some aspects, reactors may initially be purged with high purity nitrogen to remove air and create an inert environment for the reactants. Following the purging process, an initial pressure and temperature is reached and maintained before the reaction is initiated.

In one non-limiting exemplary embodiment, the reactor includes a stainless-steel benchtop reactor (Model 4593, Parr Instrument Company, Moline, IL) having an inner volume of 100 mL, a mechanical stirrer, and an electric heater controlled by a 4843-controller.

i. Temperatures and Pressures

Reactors disclosed herein operate at temperatures and pressures sufficient to depolymerize polyethylene-based plastics provided to the reactor and generate desired liquid and gaseous product yields. Reactor temperatures and pressures may be modified to attain a desired conversion and product yield. As used herein with respect to reactor conditions, "temperature" refers to an internal reactor temperature. As used herein with respect to reactor conditions, "pressure" refers to an internal reactor pressure.

In one aspect, an operating temperature of a reactor may be greater than 250° C. As an example, an operating temperature of a reactor may be greater than 300° C. For example, the operating temperature of the reactor may be greater than 250° C., greater than 275° C., greater than 300° C., greater than 325° C., greater than 350° C., greater than 375° C., greater than 400° C., greater than 425° C., or greater than 450° C. The operating temperature of the reactor may be less than 550° C., less than 525° C., less than 500° C., less than 475° C., less than 450° C., less than 425° C., less than 400° C., less than 375° C., less than 350° C., less than 325° C., less than 300° C., or less than 275° C. As an example, an operating temperature of a reactor may be greater than 250° C. and less than 550° C. As an example, an operating temperature of a reactor may be from about 300° C. to about 450° C. As an example, an operating temperature of a reactor may be from about 320° C. to about 380° C. As an example, an operating temperature of a reactor may be from about 340° C. to about 360° C. As an example, an operating temperature of a reactor may be about 350° C.

In one aspect, an operating pressure of a reactor may be greater than 1 megapascal (MPa). For example, the operating pressure of the reactor may be greater than 2 MPa, greater than 3 MPa, greater than 4 MPa, greater than 5 MPa, greater than 6 MPa, greater than 7 MPa, greater than 8 MPa, greater than 9 MPa, greater than 10 MPa, greater than 11 MPa, greater than 12 MPa, greater than 13 MPa, greater than 14 MPa, greater than 15 MPa, greater than 16 MPa, greater than 17 MPa, greater than 18 MPa, greater than 19 MPa, greater than 20 MPa, greater than 21 MPa, greater than 22 MPa, greater than 23 MPa, greater than 24 MPa, greater than 25 MPa, or greater than 26 MPa. The operating pressure of the reactor may be less than 30 MPa, less than 29 MPa, less than 28 MPa, less than 27 MPa, less than 26 MPa, less than 25 MPa, less than 24 MPa, less than 23 MPa, less than 22 MPa, less than 21 MPa, less than 20 MPa, less than 19 MPa, less than 18 MPa, less than 17 MPa, less than 16 MPa, less than 15 MPa, less than 14 MPa, less than 13 MPa, or less than 12 MPa. As an example, an operating pressure of a reactor may be greater than 1 MPa and less than 30 MPa. As an example, an operating pressure of a reactor may be from about 2 MPa to about 20 MPa. As an example, an operating pressure of a reactor may be from about 6 MPa to about 14 MPa. As an example, an operating pressure of a reactor may be from about 8 MPa to about 12 MPa. As an example, an operating pressure of a reactor may be from about 9 MPa to about 11 MPa. As another example, an operating pressure of a reactor may be about 10.6 MPa. As another example, an operating pressure of a reactor is about 9.04±0.16 MPa.

ii. Residence (Reaction) Times

Reactors disclosed herein operate at reaction times sufficient to depolymerize polyethylene-based plastics provided to the reactor and generate desired liquid and gaseous product yields. Reaction times may be modified to attain a desired conversion and product yield. As used herein with respect to reactor conditions, "residence time" or "reaction time" refers to the amount of reactor operating time required to sufficiently depolymerize and convert a polyethylene-based plastic into liquid, gas, and solid phase products after a reaction is initiated.

In one aspect, a polyethylene-based plastic is sufficiently depolymerized when at least 50% of the polyethylene-based plastic is converted to liquid and gaseous phase products. In another aspect, a polyethylene-based plastic is sufficiently depolymerized when at least 60% of the polyethylene-based plastic is converted to liquid and gaseous phase products. In one aspect, a polyethylene-based plastic is sufficiently depolymerized when at least 70% of the polyethylene-based plastic is converted to liquid and gaseous phase products. In one aspect, a polyethylene-based plastic is sufficiently depolymerized when a yield of liquid phase product of at least about 20% is attained. In one aspect, a polyethylene-based plastic is sufficiently depolymerized when a yield of liquid phase product of at least about 30% is attained. In one aspect, a polyethylene-based plastic is sufficiently depolymerized when a yield of liquid phase product of at least about 40% is attained.

In one aspect, a reaction time may be greater than 15 minutes. For example, the reaction time may be greater than 20 minutes, greater than 25 minutes, greater than 30 minutes, greater than 35 minutes, greater than 40 minutes, greater than 45 minutes, greater than 50 minutes, greater than 55 minutes, greater than 60 minutes, greater than 65 minutes, greater than 70 minutes, greater than 75 minutes, greater than 80 minutes, greater than 85 minutes, greater than 90 minutes, greater than 95 minutes, greater than 100 minutes, greater than 105 minutes, greater than 110 minutes, greater than 115 minutes, greater than 120 minutes, greater than 125 minutes, greater than 130 minutes, greater than 135 minutes, greater than 140 minutes, greater than 145 minutes, or greater than 150 minutes. The reaction time may be less than 180 minutes, less than 170 minutes, less than 160 minutes, less than 150 minutes, less than 140 minutes, less than 130 minutes, less than 120 minutes, less than 110 minutes, less than 100 minutes, less than 90 minutes, less than 80 minutes, less than 70 minutes, less than 60 minutes, or less than 50 minutes. As an example, a reaction time may be greater than 20 minutes and less than 180 minutes. As an example, a reaction time is from about 30 minutes to about 120 minutes. As an example, a reaction time is from about 40 minutes to about 90 minutes. As an example, a reaction time is from about 80 minutes to about 100 minutes.

II. Experimental Example Methods and Results

A. Materials and Methods

The e-waste plastic (plastic for waste cables insulation) (SRP plastic, hereafter) used for this work was supplied by SRP (Salt River Project power and water) in Arizona. The technical data from SRP show that it comprises linear low-density polyethylene (LLDPE), crosslinked polyethylene (XLPE), and carbon-doped crosslinked polyethylene, as shown in FIG. 1. It may further be classified as LLDPE, XLPE, small amounts of carbon, and trace amounts of silane crosslinking agents. Proximate and ultimate analysis of the plastic feedstock is presented in Table 1.

TABLE 1

Proximate and ultimate analysis of the SRP plastic feedstock.

| | SRP plastic |
|---|---|
| Proximate | Wt. % |
| Moisture | 0 |
| Ash content | 1.31 |
| Volatile matter content | 93.65 |
| Fixed carbon content$^b$ | 5.04 |
| Ultimate | |
| Elemental Composition | wt. % |
| Carbon | 85.50 ± 0.24 |
| Hydrogen | 13.54 ± 0.003 |
| Nitrogen | 0.31 ± 0.12 |
| Oxygen$^a$ | 0.65 ± 0.12 |
| Calorific high heat value, HHV (MJ/Kg) | |
| Calorific value | 43.52 ± 0.12 |

$^a$Fixed carbon, % = 100-volatile matter − ash − moisture
$^b$Calculated by difference O, % = 100 − Sum (C, H, N)

The SRP plastic has a high heat value (HHV) of 43.38 MJ/kg, which indicates its good feasibility as a feedstock for energy recovery. The initial feedstock contains small amounts of aluminum and copper from the wires in the cable. To eliminate the interference of metal in the experiment, dilute hydrochloric acid was used to remove the metal from the sample. Two sizes of plastic particles were prepared using a crusher and a 4 mm, 0.85 mm sieve for this test. All chemicals ([BMIM][PF$_6$], Methanol, Acetone, and Dichloromethane) used in this work were commercially purchased from Sigma Aldrich, and deionized (DI) water was prepared in-house with σ=18±2 μS.

B. Preliminary Hydrothermal Liquefaction Experimental Procedures and Results

Discarded polyethylene plastics were processed with ionic liquid and acidic or basic catalysts under HTL conditions with different solvents (water, methanol, ethanol, butanol and acetone) to fractionate the polymer into three components: gases, liquids, and solid residues. The HTL products were then separated and purified in a combined membrane and adsorption process to recover small hydrocarbon molecules in a gas phase, liquid hydrocarbons, solid residue, and ionic liquid catalysts. The recovered hydrocarbons, after further purification, may be reused as feedstocks for synthesizing new polymers and other advanced materials. The partially converted plastics will be studied as a rejuvenator or adhesive for aged road pavements.

The described technology is based on three hypotheses: (1) Polyethylene may be effectively depolymerized into low molecular weight feedstock hydrocarbons with ionic liquid superacid catalysts under thermal or hydrothermal conditions; (2) The depolymerization products may be separated from the ionic liquid by a membrane/adsorption hybrid process, enabling recovery of low molecular weight hydrocarbons and the ionic liquid to be reused in further reactions; and (3) Partially converted plastics are a suitable rejuvenator or adhesive for aged road pavements.

Hydrothermal liquefaction is a thermochemical process for the deconstruction of macromolecules of natural and synthetic polymers into their corresponding molecular building blocks at subcritical and supercritical water conditions. It was previously found that the depolymerization reaction rate was greatly enhanced and a complete deconstruction of condensation polymerization plastics to monomers was observed in less than 60 minutes when supercritical water or methanol was used as the reaction medium. The unique reactive properties (low viscosity, fast diffusion, high density, high solubility of organics, and no surface tension) of pressurized hot water and other solvents were combined with the good tunability of ionic liquid catalysts to achieve high selectivity of the plastic depolymerization reactions.

Hydrothermal liquefaction experiments were carried out to validate the hypothesis and assumptions. The mixed plastic sample was generated from the insulation and packaging materials of electrical cables from the e-waste recycling facility of the SRP. Typical cable insulators are made of cross-linked polyethylene and some carbon coatings. A given amount of the plastic sample was mixed with a reaction solvent (water, methanol, ethanol, and acetone) and a small amount of catalyst (acid or ionic liquids) in a 100 mL reactor. The reactor was first purged with $N_2$ to remove air and then heated to a desirable temperature for 40-90 minutes at a process pressure ranging from about 2 MPa to about 20 MPa. In some experimental embodiments, the heating was performed at a process pressure of about 10.6 MPa.

After the reaction, the products were collected and analyzed. As shown in Table 2 and FIG. 2-6, as high as 74.76% of the plastic was converted to either liquid or gaseous products, and as high as 40% of liquid product was obtained when 3-acetone was used as the reaction solvent. Additionally, as high as ~90% of polyethylene samples were converted to liquid or gaseous products at 350° C. in about 40-90 minutes using 1-Butyl-3-methylimidazolium tetrafluoroborate ([BMIM][BF4]) catalyst. The liquid product obtained with [BMIM][BF4] catalyst contains a mixture of cyclic aromatic hydrocarbons and long-chain branched hydrocarbons with a molecular weight between 158 Da to 364 Da, including benzene, 1,1-ethylidenebis[4-ethyl, p-terphenyl, (1-Methylpenta-1,3-dienyl)benzene, and heptadecane, 9-hexyl-. The gaseous product from the same experimental run with [BMIM][BF4] catalyst contains ethylene, ethane, propane, 2-methylpropane, butane, and other gases, which is similar to the reported gaseous composition. The solid residue from the HTL is mainly partially converted plastics. The gaseous and liquid products may be separated and purified as basic building blocks for many value-added applications including synthesizing new polymers and other advanced materials.

TABLE 2

Preliminary hydrothermal and solvothermal liquefaction results on SRP mixed polyethylene plastic samples.

| plastic/ solvent | temp. (° C.) | pressure (MPa) | catalyst | reaction time (min) | conversion | liquid product yield | gas product yield |
| --- | --- | --- | --- | --- | --- | --- | --- |
| 1:13 ($H_2O$) | 350 | 10.6 | No | 90 | 58% | 4.6% | 53.0% |
| 1:16 ($H_2O$) | 350 | 10.6 | HCl (10%) | 90 | 35% | 1.6% | 33.6% |
| 1:16 ($H_2O$) | 350 | 10.6 | $H_2SO_4$ (5%) | 90 | 30% | 1.2% | 28.7% |
| 1:18 ($CH_3OH$) | 315 | 10.0 | No | 90 | 10% | 8.3% | 2.5% |
| 1:18 ($C_2H_5OH$) | 320 | 10.1 | No | 90 | 13% | 9.8% | 3.0% |
| 1:20 (acetone) | 350 | 10.6 | No | 90 | 74.76% | 40.75% | 34.01% |
| 1:20 ($H_2O$) | 350 | 10.6 | [BMIM][PF2] | 90 | 35% | 4.9% | 30% |
| 1:20 ($H_2O$) | 350 | 10.6 | [BMIM][BF4] | 90 | 50% | 16.5% | 30.5% |

C. Liquefaction Experimental Procedures and Product Separation

Thermal liquefaction experiments were performed in a stainless-steel benchtop reactor (Model 4593, Parr Instrument Company, Moline, IL). The setup contains a reactor with an inner volume of 100 mL, a mechanical stirrer, and an electric heater controlled by a 4843-controller. In a typical experimental run, 5 g of SRP plastic and 30 mL of solvent were added to the reactor. The reactor was sealed and purged with high purity nitrogen to create an inert environment for the reactants. Following the purging process, the initial pressure of 1.4 MPa nitrogen was maintained before the reaction started. The reaction time begins as soon as the temperature reaches the desired value. The reactor was cooled down to room temperature after the reaction finished and an electric fan was used to speed up the process, then the incondensable gases were collected by a gasbag, and the reactor was then opened. The average heating duration in this procedure was 40 minutes, and the average cooling duration was 40 minutes.

In HTL systems, 15 mL dichloromethane was added to the reactor and stirred for 5 minutes to complete the extraction process. The contents (liquid and solid mixture) were then transferred to a glass separating funnel equipped with a dried and pre-weighted filter paper (Whatman filter paper #4) to separate the solid from the liquid fraction, and the reactor, stirrer, and glassware were washed with 15 mL of dichloromethane to avoid product losses. The dichloromethane phase was separated and vaporized in a 35° C. vacuum rotary evaporator to recover the crude oil. The aqueous phase was clear and almost organic-free after extraction with dichloromethane. The solid fraction was dried in an oven at 80° C. for >6 h and termed as a solid residue. All the crude oil and liquid fractions were stored (under ~5° C.) for further analysis.

For STL systems, the products are filtered directly without extraction and phase separation. Three series of thermal liquefaction experiments were carried out to investigate the effect of solvent, reaction duration, and reaction temperature of the reaction system: (1) The reaction of four different solvent systems (HTL, ionic liquid catalyzed HTL, methanol STL, and acetone STL) under the conditions of temperature, reaction duration, and the solid-liquid ratio of 350° C., 90 min and 1:6, respectively; (2) acetone STL with reaction duration in the range of 30-120 min, reaction temperature and the solid-liquid ratio of 350° C. and 1:6; (3) acetone STL at reaction temperatures between 300 and 375° C. with 25° C. intervals, reaction duration and the solid-liquid ratio of 60 min and 1:6, respectively. In addition, in order to evaluate the interference level of metal impurities and sample particle sizes on the experimental results, the control experiments of samples with metal impurities and the different particle sizes of samples were conducted under the conditions of acetone STL with temperature, reaction duration, and a solid-liquid ratio of 350° C., 90 min, and 1:6, respectively. These two controlled trials are relevant for later commercial applications because plastic recycling is used on a commercial scale. The product yields were calculated by the following equations:

$$\text{Crude oil yield, \%} = \frac{\text{Weight of oil}}{\text{Weight of feedstock}} \times 100$$

$$\text{Solid residue yield, \%} = \frac{\text{Weight of solid}}{\text{Weight of feedstock}} \times 100$$

$$\text{Gas yield} + \text{mass loss, \%} = (1 - \text{Crude oil yield} - \text{Solid yield}) \times 100$$

$$\text{Energy recovery, \%} = \frac{\text{HHV of crude oil} \times \text{Crude oil yield}}{\text{HHV of the feedstock}} \times 100$$

$$\text{Conversion, \%} = (1 - \text{Solid yield}) \times 100$$

In order to evaluate the economy of STL, the solvent recovery rate of the acetone STL experimental group was calculated. At the same time, a blank experiment was performed, in which only 30 mL Acetone was added to the system. After 350° C., 90 min of thermal process and cooling procedure, and filtration of solid residue was simulated, then the solvent recovery was calculated. The acetone recovery rate was 97% in the experimental group and 97.5% in the blank group. The solvent recovery of the blank group did not reach 100% because of the volatilization of the solvent during the operation simulating solid separation and the solvent recovery process.

D. Analytical Methods

GC/MS analysis of crude oil samples was performed using a modified Petroleum refinery reformate standard procedure (Corporation, 2010). Agilent 7890 A GC equipped with a ZB-5 ms column (30 m×0.25 mm I.D.×0.25 μm film thickness) with 1 uL injections were made split less. The oven program started at 40° C. and held for 4 min then ramped at 5° C./min to 110° C., then ramped to 320° C. at 3° C./min. The gas composition was identified by a micro-GC (CP-4900, Varian Inc., US), with thermal conductivity detectors (TCDS). The proximate analysis (volatile matter (VM), ash content (AC), and fixed carbon (FC)) of the feedstock, char, and crude oil were performed according to ASTM D3172 (D3172-07a, 2013) using the thermogravimetric analysis (TGA). The TGA analysis included heating~10 mg of the dry sample from room temperature to 925° C. (heating rate: 20° C./min) under a nitrogen flow rate of 50 mL/min and a purge flow rate of 30 mL/min using NETZSCH TG 209 Libra thermal analyzer (Germany). A bomb calorimeter (Parr Model 6725 Semi-micro calorimeter, Moline, IL) was used to estimate the HHV in MJ/kg. The ultimate analysis of the products was analyzed using a Thermo Series II CHNS/O elemental analyzer. Approximately 3-5 mg of the sample is used in the analyzer to measure the carbon (C), hydrogen (H), nitrogen (N), and oxygen (O). Ultra-high-purity gasses (nitrogen, oxygen) were used during the operation of the TGA, the bomb calorimeter, and the CHNS/O elemental analyzer.

E. Product Fraction Yields i. Effect of Solvent Type on the Products

Figure 7:
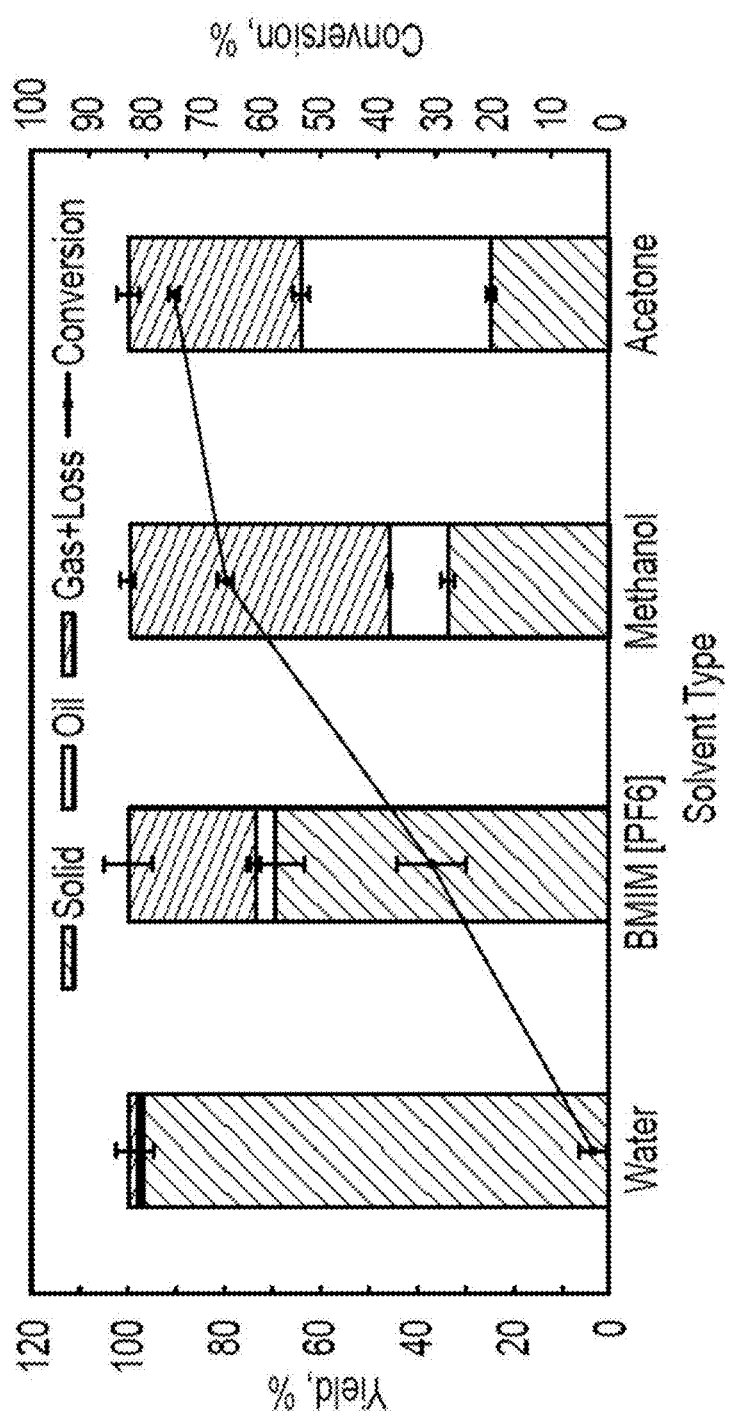
FIG. 7 is a graph showing the variation of product fraction yields (wt. %) and conversion from SRP plastic thermal liquefaction with different solvent types (350° C., 90 min).

Different liquefaction methods (HTL, ionic liquid catalyzed HTL, and STL) were used to study the thermal decomposition of SRP plastic at 350° C. and 90 min reaction duration (FIG. 7). The solvent type has a great influence on the degradation of SRP plastic. It can be seen from FIG. 7 that acetone treatment achieves the highest conversion of 75.34% at 350° C. and 90 min reaction duration, and its products contain 39.33% crude oil, 24.66% solid residue, and 36.01% gas plus loss. Compared with the extremely low conversion of water and ionic liquid aqueous solution, acetone showed excellent performance in thermal liquefaction. In the HTL combination, only 2.81% of conversion was obtained, and 97.19% of solid residues remained in plastic form. In the reaction of ionic liquid catalyzed HTL, the catalytic effect of ionic liquid is obvious, and the conversion is increased to 30.74%, among which the oil production is notably increased (4.19%).

SRP plastic is minimally depolymerized in water at 350° C., indicating that subcritical water cannot meet the degradation conditions of polyethylene. The SRP plastic degradation in supercritical water (SCW) was carried out at 375° C. and 400° C. for 90 min, and 7.5% and 22.8% oil yields were obtained, respectively. However, when the temperature is 400° C., the reaction system produces a pressure as high as 28 MPa, which is detrimental to the economic profit of the industrial chain due to the higher input of high-temperature high-pressure equipment and energy for industrial production. A previous study reported that the reaction temperature of polyethylene HTL needs to reach 450-480° C. in the supercritical water, although degradation begins at 375° C., it takes a long time at lower temperatures, this is consistent with the experimental results of the present study. Another previous study reported that polyethylene degradation in SCW achieved a 30% conversion (%) at 420° C. for 30 min. Therefore, the reaction time seems to have an effect on the HTL of polyethylene, and subcritical water cannot be considered as a suitable solvent for polyethylene thermal liquefaction. Ionic liquid showed a good catalytic effect and improved the product conversion, but methanol and acetone were more prominent in the reaction. Under relatively mild conditions (the pressure of the acetone system is 9.04±0.16 MPa when at 350° C.), the acetone system obtains a 75.34% conversion (%) and high oil yield, which makes a product of higher value (compared with other solvents). In addition, gas produced by the acetone system was quantitatively analyzed by GC, and gas products included $H_2$ (6%) and $CH_4$ (94%), therefore, the value of gas products is also indisputable. Therefore, acetone is a promising solvent choice for the value-added utilization of SRP plastic and other polyethylene waste. In addition, the methanol system also obtained a high conversion (66.49%).

Figure 8:
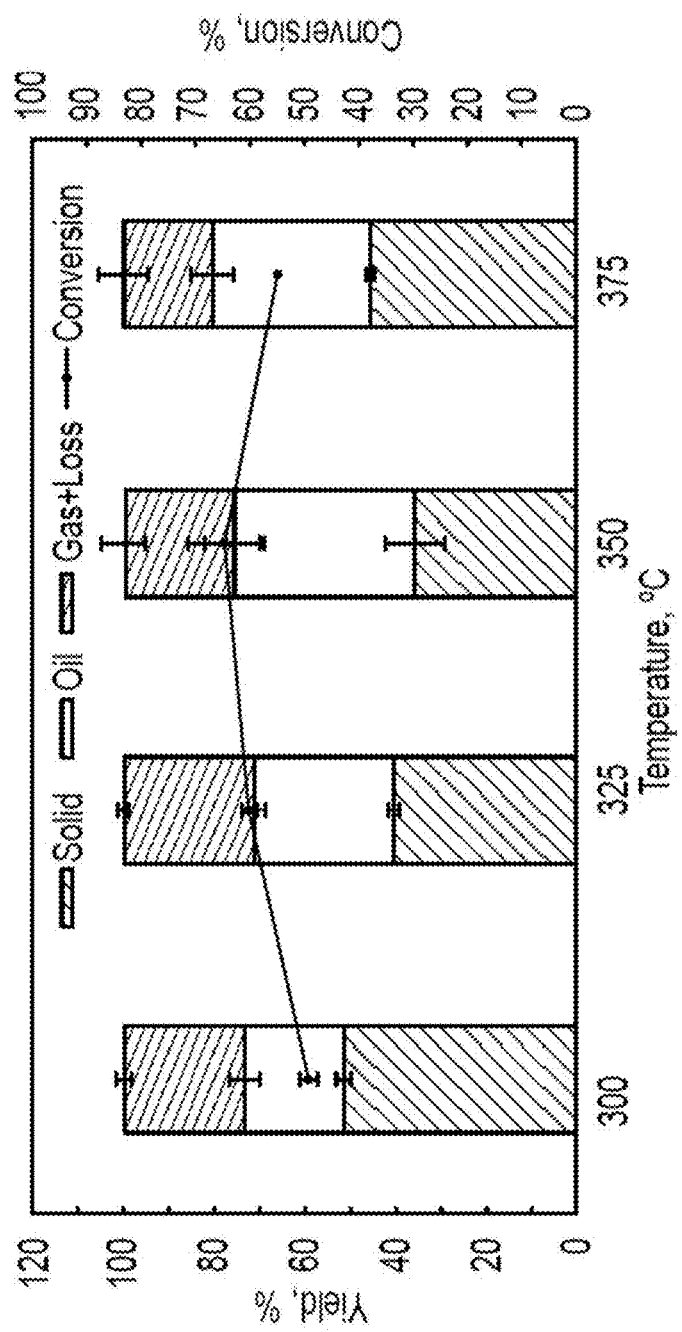
FIG. 8 is a graph showing the variation of product fraction yields (wt. %) and conversion from SRP plastic thermal liquefaction using acetone as the solvent with varying temperatures (300-375° C., 60 min).
Figure 9:
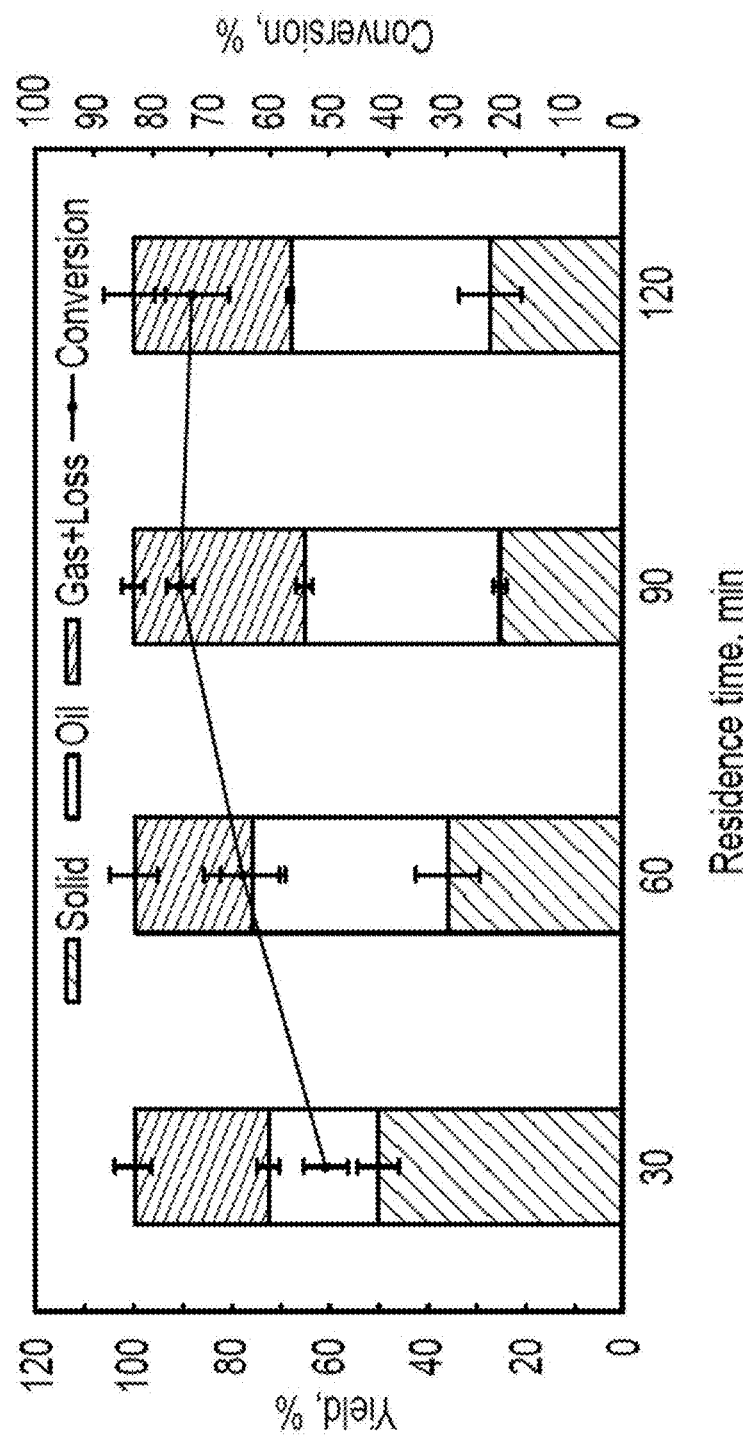
FIG. 9 is a graph showing the variation of product fraction yields (wt. %) and conversion from SRP plastic thermal liquefaction using acetone as the solvent with varying residence (reaction) times (350° C., 30-120 min).

Previous studies have verified that the thermal degradation of polymers in solvents mainly depends on the dissolution of polymers and the solvolysis reaction, therefore the solvation capability of the solvent is an important parameter for the reactions. The dipole moment and dielectric constant of the solvent molecules are related to the solvation capability of the solvent. Acetone has a low dielectric constant relative to both water and methanol, and acetone has a lower polarity and a higher conversion than other solvents, which can be attributed to the solvation of polyethylene in acetone. On the other hand, the dielectric constant of solvent molecules varies with temperature. In sup/subcritical state, the dielectric constant of the solvent decreases compared with that at room temperature, which makes the solvent have stronger solvation capability. The supercritical temperature of methanol and acetone is much lower than that of water. Polyethylene is a non-polar macromolecule that melts at 110° C. When depolymerization of polyethylene is carried out at 350° C., organic solvents including acetone at supercritical conditions disperse and dissolve polyethylene molecules more efficiently than subcritical water does, therefore the solvolysis process with organic solvents can decompose polyethylene more effectively and generate a higher oil yield.

ii. Effect of Reaction Temperature and Residence Time on the Product Yield and Distributions Temperature and time can play an important role in thermal liquefaction. Two groups of experiments (300-375° C., 60 min; and 350° C., 30-120 min) were conducted to study the response of reaction temperature and time to the products of SRP plastic STL in acetone (FIG. 8-9). The conversion was the highest at 350° C. and reaction time of 90 min and got the highest crude oil yield and lowest solid residue.

It can be seen that the free radical repolymerization in the system under excessive temperature and time leads to an increase of carbon accumulation, and the free radical repolymerization is more obvious in response to temperature. When the reaction time was 60 min, both the conversion and crude oil yield showed an upward trend as the temperature increased, and slightly decreased after 350° C. (FIG. 8). At 350° C., the conversion also showed a trend of increasing before 90 min and then decreasing slightly. From the product, the solid residue gradually decreased with the increase in reaction time, and the crude oil yield increased (FIG. 9). When the reaction time was from 60 min to 120 min, the crude oil yield gradually tended to balance, and there was a slight increase (from 40.09% to 41.02%). The effect of reaction time and temperature on reaction processes and products is similar to that of other polymer hydrothermal liquefaction reactions.

iii. Effect of Metal Impurities and Sample Particle Sizes on the Products

Figure 10:
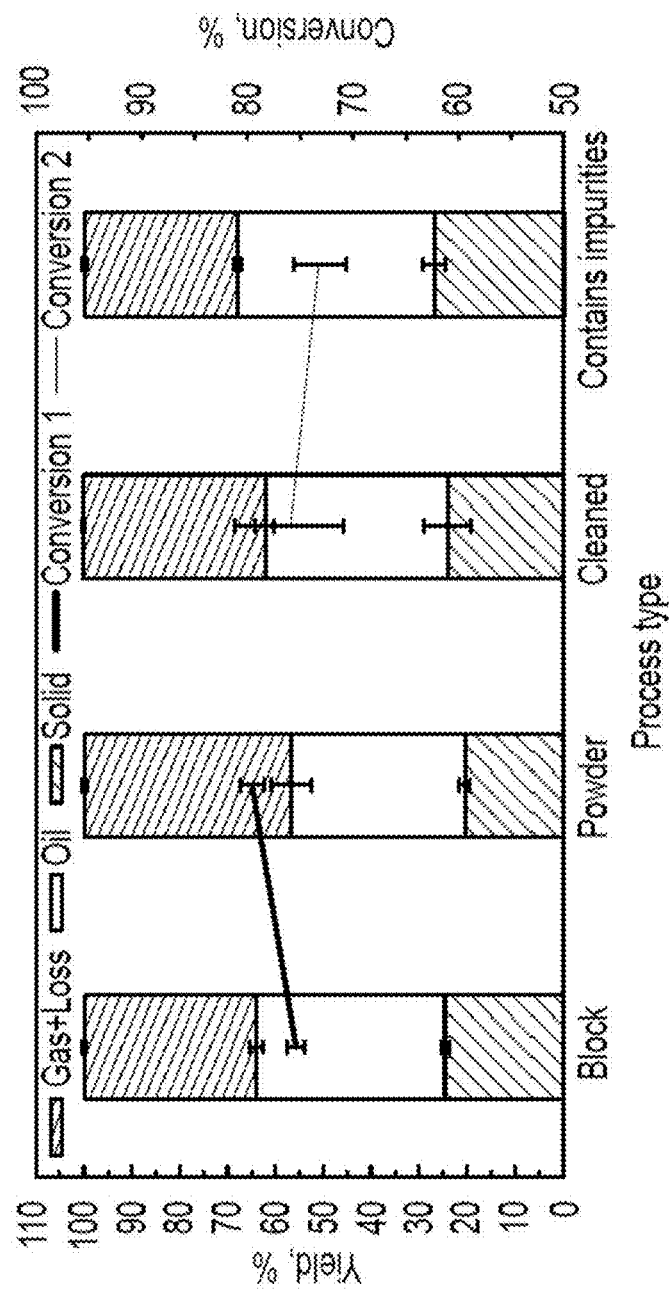
FIG. 10 is a graph showing the effect of sample particle size (block vs. powder) and metal impurities on product fraction yields (wt. %) and conversion from SRP plastic thermal liquefaction using acetone as the solvent at 350° C. for 90 min.

In addition to the specific solvent system, temperature, and reaction time, particle size and sample impurities also interfere with the thermochemical conversion process and have an effect on the reaction. Therefore, two groups of experiments were carried out to evaluate this (FIG. 10). It can be seen that the conversion of powder samples increased slightly, mainly the gas yield increased, but the oil yield decreased. The crushing of the sample may only advance the dissolution process of the sample in the high-temperature solvent without changing its solubility. The advance in the reaction process will further transfer the oil and solid to gas. In the liquefaction reaction, the influence of particle size is at a low level, having a much smaller influence than that in the gasification and pyrolysis process, which is attributed to the good mass and heat transfer of the solvent. SRP plastic contains a small amount of copper and aluminum powder in the wire, which has a certain positive effect on the reaction. It can be seen that the oil yield of the sample containing metal impurities is slightly higher than that of the sample after cleaning, but the data show that the sample cleaning increases the conversion and gasification yield, which is caused by the use of powder samples in the experiment.

Thermal liquefaction is highly inclusive and is generally suitable for a variety of samples, including municipal solid waste, sludge, kitchen waste, biomass, so impurities are allowed in this process. In general, from the perspective of industrial applications, excessive crushing and cleaning of samples are unnecessary. Over-crushed samples may also easily lead to clogging of equipment piping.

F. Elemental Composition of Crude Oil Products

Table 3 shows the elemental analysis and HHV of crude oils with different thermal liquefaction solvent types, the order of H/C ratio is feedstock>oil of methanol STL>oil of acetone STL>oil of [BMIM][PF$_6$] HTL>oil of HTL. Due to unsaturated chain hydrocarbons and cyclic compounds in the crude oil products of the experimental groups, the H/C ratio of crude oil is lower than that of feedstock. On the other hand, both the oil of acetone STL and methanol STL had an extremely low O/C ratio of 0.01 and 0.05, while the other two experimental groups had slightly higher O/C ratios. A higher O/C ratio is undesirable because it reduces the calorific value and increases the hydrogen requirement for fuel production in any subsequent upgrade steps. The N/C ratios of oil of HTL and [BMIM][PF$_6$] HTL group are 0.03 and 0.1, respectively. The oxygen and nitrogen in the crude oil come from the aged part of the SRP plastic. The aged polyethylene is more easily hydrolyzed due to the addition of oxygen and nitrogen sites, so the crude oil product of HTL shows a lower yield and higher oxygen, and nitrogen content. Therefore, upgrading would be important to improve the HTL crude oil quality for use in transportation fuel applications.

TABLE 3

Ultimate analysis of the oil products obtained at 350° C. for 90 min with various thermal liquefaction degradation methods.

| Component (wt. %) | HTL | [BMIM][PF$_6$] HTL | Methanol STL | Acetone STL |
| --- | --- | --- | --- | --- |
| C | 50.82 ± 0.17 | 61.33 ± 0.09 | 81.39 ± 0.78 | 85.66 ± 0.21 |
| H | 6.18 ± 0.19 | 8.85 ± 0.09 | 12.73 ± 0.31 | 12.76 ± 0.18 |
| N | 1.5 ± 0.01 | 7.00 ± 0.07 | 0.45 ± 0.028 | 0.15 ± 0.01 |
| O$^a$ | 41.5 ± 1.05 | 22.82 ± 0.10 | 5.43 ± 1.06 | 1.44 ± 0.04 |
| H/C atomic ratio | 1.45 | 1.72 | 1.86 | 1.77 |
| O/C atomic ratio | 0.61 | 0.28 | 0.05 | 0.01 |

TABLE 3-continued

Ultimate analysis of the oil products obtained at 350° C.
for 90 min with various thermal liquefaction degradation methods.

| Component (wt. %) | HTL | [BMIM][PF$_6$] HTL | Methanol STL | Acetone STL |
|---|---|---|---|---|
| N/C atomic ratio | 0.03 | 0.1 | 0 | 0 |
| HHV (MJ/Kg) | 27.74 ± 0.06 | 35.29 ± 0.47 | 43.28 ± 0.16 | 43.83 ± 0.33 |

[a]Calculated by difference O, % = 100 − Sum (C, H, N)

HTL and ionic liquid catalyzed HTL experimental groups have a high O/C ratio, which means that more solvent molecules (hydrone) act as reactants to participate in the thermal liquefaction of polyethylene. One previous study pointed out that polypropylene has aliphatic carbon atoms, which are more likely to produce reactive intermediates which may react with water. Polyethylene has an aliphatic carbon atomic structure similar to polypropylene, and polyethylene shows similar reaction properties to the polypropylene reaction in subcritical water. The combination of organic solvents contains a higher C/H ratio and a lower O/C ratio, which generally means higher oil quality.

HHV is an important fuel characteristic that determines the energy content of the fuel. The HHV obtained by the bomb calorimeter may reflect the oil quality more accurately than the result estimated by the element composition. A previous study proposed that the HHV obtained by the ASTM Bomb calorimetry method was 3 MJ/kg lower than the calculated value of element content. The reaction of the organic solvent with polyethylene produced higher HHV (43.28-43.83 MJ/kg) and it is similar to the HHV of conventional diesel (43.06 MJ/kg). Moreover, polyethylene pyrolysis oil had the HHV of 40.5-41.8 MJ/kg, this illustrates that the crude oil products obtained from solvothermal liquefaction have better fuel properties than pyrolysis. By comparison, it can be concluded that the organic solvent as the thermal liquefaction solvent of polyethylene can keep the high H/C value of oil products and avoid the increase of O/C value, which is beneficial to the valorization of waste polyethylene.

G. Thermogravimetric Analysis of Oil Products

The crude oils from STL of SRP plastic have a complex molecular composition, usually, molecules with boiling points below 400° C. are most valuable for producing liquid fuels, and the mass fraction of volatile components in this range can be an important indicator of the quality and potential utility of the oil. TGA was performed to understand the boiling point distribution of crude oil under different solvent types and reaction conditions, and many researchers use it to simulate distillation to collect data about fuel performance. The percentage of crude oil sample and derivative weight loss under TGA analysis is summarized in FIG. 11, which corresponds to boiling point reductions in refined products. During the evaporation of dichloromethane and other solvents in crude oil, lighter molecules are lost in the sample, so compounds boiling below 65° C. are not included in the FIG. 11.

The quality of crude oil products is demonstrated under different reaction systems and conditions. In the experimental series of different solvent types, the low molecular weight components of the oil obtained by the two groups of STL are higher than those obtained by the other groups of HTL. Especially, the oil obtained by the acetone STL contained a boiling range of less than 400° C. for 87.6% of the components, which has a higher economic value. In contrast, the low boiling point region (<400° C.) of the ionic liquid group had the lowest content.

In the experimental group with different reaction durations, the change in oil quality with time was observed. The low boiling point region (400° C.) decreased from 77.89% for 30 min to 69.15% for 60 min with the passage of reaction duration. Then it gradually increased to 87.6% at 90 min and reached the maximum at that time, and finally decreased to 68.03% at 120 min. From this information, the process and intensity of the thermal liquefaction reaction can be inferred. At the beginning of the reaction, a small number of low molecular weight hydrocarbon chains break off from the large polyethylene chains to form the initial oil component. At this stage, the low molecular components show a high level in oil products, and these low molecular weight hydrocarbons have a low boiling range. With the reaction of polyethylene advancing into rapid random scission, long-chain polyethylene feedstock is continuously cut to form a large molecular oil component. This is because it has the advantage of a large molecular weight to obtain a high proportion of oil products. When the reaction reached 90 minutes, the reaction degree reached the adequate stage. The large molecules in the oil component decrease as the chain are broken and the smaller molecules gain the advantage. Then, due to the deepening of the reaction degree and the aggravation of the side reaction, the polymerization of the unsaturated hydrocarbon chain and radical recombination reaction leads to the increase of the average carbon number of oil products, thus showing a decrease in the proportion of low boiling range products. During this period, some oil products are also transformed into gaseous components with excessive reaction, which is detrimental to the accumulation of the target oil products.

In the experiment series of acetone STL at different temperatures, the distribution of oil components in different boiling stages varies with temperature discontinuously. From the perspective of the reaction process, it has the same performance of two higher ends as in the stage of reaction time from 30 min to 90 min at 350° C. This is because the reaction time under 60 min is not sufficient. The reaction temperature was increased to fill the gap in reaction time. Here, the result from the reaction time of 90 min at 350° C. is close to that of 60 min at 375° C., indicating that the insufficient reaction time may be offset to some extent by increasing the temperature.

Therefore, the TGA data shows that the oil molecules obtained from the polyethylene STL volatilized in a similar temperature range as petroleum crude oil, so the existing refining infrastructure is suitable for the further processing of STL oil products. In addition, both reaction temperature and time can adjust the boiling point distribution of oil products by controlling the reaction severity.

H. GC-MS Analysis of Oil Products

Crude oil is the main product of SRP plastic thermal liquefaction. To explore the mechanism of the polyethylene thermal liquefaction reaction, the chemical composition of the oil was measured by GCMS. The detected components were classified into five categories (Table 4). The oil components of SRP:Water experiment group mainly include n-alkanes (59.01%) and a-alkene (18.93%), which have a long hydrocarbon chain distribution. This is attributed to the random scission of polyethylene under the thermal degradation of 350° C. As the water does not reach the supercritical state, it plays a limited role in the dissolution and dispersion of polyethylene in this reaction, and only plays a role in heat transfer and a certain degree of hydrolysis. Due to the introduction of more reactive 0 and N sites into the aging part of polyethylene in the SRP plastic after long-term high temperature and photochemical erosion, the subcritical water at 350° C. does not meet the thermal cracking of polyethylene, but the aging part is degraded and produces crude oil with a lower yield, so 350° C. HTL is not suitable for polyethylene thermal liquefaction. One previous study reported that polyethylene is a polymer of addition polymerization, therefore due to the lack of active sites, the HTL system of polyethylene mainly takes place in thermal cracking reaction, while the hydrolysis reaction hardly takes place. However, polyethylene is sensitive to thermal oxidation, and during the use of cable plastic, the surface layer of LLDPE was partially oxidized and oxygen atoms were introduced, thus increasing a small number of reaction sites and promoting the hydrolysis reaction to a certain extent, therefore, low levels of hydrolysis may occur in the aged part of polyethylene.

[BMIM][$PF_6$] is a common neutral ionic liquid, it has a neutral weak coordination anion, so it plays a role in enhancing the solvation of polyethylene feedstock in the aqueous solution. In theory, it can promote the thermal liquefication of feedstock, which has been confirmed by the oil yield and substrate conversion. However, the subcritical state of water makes the performance of ionic liquid aqueous solution still inferior to organic solvent. It can be seen from the composition of oil that the ionic liquid HTL of polyethylene does not produce alkanes and alkenes, which indicates that the [BMIM][$PF_6$] HTL reaction does not have random scission of polyethylene, but contains hydrolysates containing N and O. Therefore, the catalytic direction of [BMIM][$PF_6$] in the system is the thermal hydrolysis of polyethylene, with strong catalytic specificity. [BMIM][$PF_6$] catalyzed HTL crude oil has an average carbon atom number of 9.16, which is much lower than the HTL combination (18.70). The catalytic hydrolysis of ionic liquid is reflected here. So, in the reaction, the ionic liquid improves the solubility of the sample in subcritical water. The ionic liquid shows catalytic activity in hydrolysis reaction and converts the aged part of polyethylene into the heteroatomic hydrocarbon containing 0 and N elements. Because this article is more focused on the regulation of solvation effects on the reaction, neutral ionic liquids were chosen here. The ionic liquids are widely used in the study of biomass liquefaction because of their unique properties. Acidic ionic liquid has better performance in biomass catalyzed liquefaction. The ionic liquid can affect product distribution, however, and the type of ionic liquid has no notable effect on the chemical composition of the product, and the choice of anion is considered to play a decisive role in ionic liquid catalyst. Therefore, according to the existing research background, further studies on the catalytic liquefaction of plastic containing heteroatoms by ionic liquids have good prospects.

Compared with the HTL groups, the product distribution of STL reaction was more similar in the methanol and acetone groups. The case of SRP:methanol obtains 51.91% alkane and 43.31% alkene, and alkane in addition to n-alkanes also contains 4.32% branched alkane. As mentioned earlier, n-alkanes and alkenes come from the random scission pathway of polyethylene at high temperatures. A previous study of LDPE pyrolysis stated that the increase of temperature and pressure would promote the polymerization and cyclization of alkenes and the generation of iso-paraffin and aromatic hydrocarbons. The source of isoalkane is believed to be the polymerization of alkene and radical recombination reaction. However, the difference between LLDPE, XLPE, and LDPE is that there are a large number of short-chain hydrocarbons attached to the long hydrocarbon chain in LLDPE, and XLPE has a reticular structure that some branched chains are generated after scission. Therefore, LLDPE and XLPE have a much higher probability of obtaining heterochain hydrocarbons directly through the random scission pathway than LDPE. So, the 4.32% of the alkanes here cannot be fully explained by the polymerization of the alkene and radical recombination reaction pathway. This may be an accumulation of two pathways.

The crude oil obtained by methanol STL contains 4.78% carboxyl ester, this part of the product is from the oxidized polyethylene molecules. Under the condition of high temperature, the active radical reaction in polyethylene pyrolysis promotes the participation of alcohol-hydroxyl groups, so this value may be viewed as the degree of alcoholysis. However, due to the highly stable structure of polyethylene, alcoholysis mainly occurs between oxidized polyethylene and methanol. In addition, aromatic compounds and cycloalkanes were not present in the products. In a previous study, a certain number of cycloalkanes and aromatic substances may be generated from LDPE pyrolysis at 380° C., so it can be determined that the activation temperature of the cyclization and radical recombination of olefin will be within the range of 350-380° C. Compared with pyrolysis and HTL, most of the 66.49% conversion of methanol STL at 350° C. comes from the thermal decomposition reaction caused by the solvation of supercritical methanol on polyethylene material. Therefore, solvation may effectively reduce the reaction temperature of thermal degradation of feedstock and molecular dispersion.

Acetone solvothermal liquefied crude oil contains n-alkanes (34.71%), branched alkanes (5.74%), alkenes (44.25%), cycloalkanes (4.66%), aromatic compounds (6.46%), and cycloalkenes (4.16%). Cycloalkanes and aromatic hydrocarbons appeared in this reaction, which proved that the cyclization and radical recombination of alkenes could occur at 350° C. under the action of acetone STL. Compared with the methanol STL reaction, acetone's solvation is better, making the extent of the reaction improve again. This also confirms that acetone obtains the highest conversion and crude oil yield compared with other solvents. In addition, the aromatic compounds contain 2.27% oxy-organics, which is lower than the methanol group. The low level of O/C rate represents a high HHV, which is beneficial to the refining and processing of crude oil, which has practical significance.

Other previous studies have proposed that the carbon number of the pyrolysis oil is lower when the extent of reaction is higher under the effect of temperature, even if the effect of alkene polymerization and radical recombination reaction is superimposed. SRP:water, SRP:water:[BMIM][$PF_6$], SRP:methanol, and SRP:acetone had an average carbon number of 18.70, 9.16, 19.79, and 18.57, respectively. Acetone had a better performance in the four types of solvent for the polyethylene thermal liquefaction. On the contrary, it was also found that [BMIM][PF$_6$] could play a good catalytic role in hydrolysis reaction in the polyethylene HTL.

comes from the hydrolysis reaction of the polyethylene, which proves that the ionic liquid in the HTL system reduces the reaction temperature to a certain extent and promotes the hydrolysis reaction. The content of the oxygen element of the oil from the methanol and acetone system is close to that

TABLE 4

Peak area % of crude oil components with different thermal liquefaction solvents.

| | HTL | [BMIM][PF$_6$] HTL | Methanol STL | Acetone STL |
|---|---|---|---|---|
| Alkane | 59.01 | 0.00 | 51.91 | 40.46 |
| C14 | | | | 2.51 |
| C15 | | | | 5.11 |
| C16 | | | 2.49 | 3.76 |
| C17 | 7.75 | | 3.42 | 4.82 |
| C18 | | | 3.72 | 1.79 |
| C19 | 3.71 | | 14.80 | 6.30 |
| C20 | 27.37 | | 5.17 | 8.48 |
| C21 | 20.18 | | 16.90 | 1.78 |
| C31 | | | 5.41 | 5.91 |
| Alkene | 18.93 | 0.00 | 43.31 | 44.25 |
| C16 | | | 1.80 | 3.87 |
| C17 | | | 4.17 | |
| C18 | 10.25 | | 12.19 | 22.23 |
| C19 | 4.75 | | 12.89 | 9.66 |
| C20 | 3.92 | | 8.92 | 4.89 |
| C21 | | | 3.35 | 3.60 |
| cyclane | | | | 4.66 |
| | | | | 4.66 (C$_{20}$H$_{40}$) |
| Other hydrocarbons | | | | 8.35 |
| | | | | 4.19 (C$_{13}$H$_{14}$) |
| | | | | 4.16 (C$_{14}$H$_{16}$) |
| Heteroatomic hydrocarbons | 22.06 | 100 | 4.78 | 2.27 |
| | 4.74 (C$_{11}$H$_{17}$NO$_3$) | 6.11 (C$_5$H$_8$N$_2$) | 2.47 (C$_{19}$H$_{38}$O$_2$) | 2.27 (C$_{16}$H$_{16}$O) |
| | 2.05 (C$_{14}$H$_{29}$NO) | 31.02 (C$_7$H$_{12}$N$_2$) | 2.31 (C$_{18}$H$_{36}$O$_2$) | |
| | 1.73 (C$_{15}$H$_{31}$NO) | 37.32 (C$_8$H$_{12}$O$_2$) | | |
| | 4.36 (C$_{16}$H$_{32}$O$_2$) | 3.02 (C$_9$H14O) | | |
| | 1.44 (C$_{16}$H$_{33}$NO) | 1.98 (C$_9$H$_{21}$N) | | |
| | 2.28 (C$_{17}$H$_{35}$NO) | 3.70 (C$_{10}$H$_{17}$NO) | | |
| | 2.20 (C$_{18}$H$_{36}$O$_2$) | 10.64 (C$_{13}$H$_{10}$O) | | |
| | 3.27 (C$_{20}$H$_{40}$O) | 6.21 (C$_{24}$H$_{38}$O$_4$) | | |

I. Inference of Potential Reaction Pathways of SRP Plastics

Studies have suggested that polyethylene molecules lack heteroatoms and reactive sites, so thermal cracking was the preferred depolymerization mechanism. Furthermore, solvolysis occurs mainly between oxidized polyethylene and solvent. Therefore, the main contribution of the solvent in the thermal liquefaction reaction is the good performance of mass transfer and thermal transmission brought by the solvation of feedstock and a notable reduction of the thermal cracking temperature compared with pyrolysis. The thermal cracking reaction of feedstock is the main reaction in thermal liquefaction, and its reaction rules follow the pyrolysis reaction principle.

Based on the simple element composition of polyethylene molecule and the composition analysis of crude oil products in a series of solvent systems (Table 3-4), the oxygen element (O) in the products can be traced. It can be seen from Table 5 that 5 g of polyethylene waste contains 32.5 mg of O element, while the low O element in HTL oil indicates that even the oxidized part of polyethylene cannot be completely degraded at 350° C. In contrast, the content of O element in the crude oil of ionic liquid catalyzed HTL is higher than that of feedstock, which is attributed to the catalytic performance of ionic liquid. The additional 0 of the substrate. The oxygen content of oil in the methanol system is slightly higher than that of the substrate, which may be because methanol participates in the solvation reaction of the substrate, while the solvolysis reaction level of the methanol system is higher than that of the acetone system.

It can be seen from the three groups of HTL and STL reactions that the solubility of feedstock in the solvent is positively correlated with the level of solvolysis and thermal cracking reaction, which highlights the importance of sample dissolution and dispersion in the reaction, which guides the selection of solvents in the STL reaction. Using polarity analysis of samples to match suitable solvents can make solvent selection more targeted and save large amounts of screening work. Predictably, the collection and statistics of physicochemical parameters related to polarity can guide the thermal liquefaction, including the collection of a dipole moment database of different solvents and the fitting of the model with the variation of dielectric constant with temperature and other parameters, which may provide a basis for the directional selection of solvents and reaction temperature, which will greatly promote the development of thermal liquefaction technology.

TABLE 5

Oxygen content in 5 g feedstock and corresponding crude oil products.

| Solvent system | O content, % | Oil Yield, % | Oxygenated compounds in oil, % | O content, mg |
|---|---|---|---|---|
| Feedstock | 0.65 ± 0.12 | — | — | 32.50 |
| Water | 41.5 ± 1.05 | 0.4 | 21.73 | 8.30 |
| [BMIM][PF$_6$] | 22.82 ± 0.10 | 4.19 | 100 | 47.81 |
| Methanol | 5.43 ± 1.06 | 12.2 | 4.78 | 33.12 |
| Acetone | 1.44 ± 0.04 | 39.33 | 2.27 | 28.32 |

O content, mg = 5 g of feedstock * oil yield * O content in the oil * 1000

Many researchers have studied and summarized the pyrolysis mechanism of polymers and polyethylene. One study concluded that the pyrolysis of polymers included two distinct reactions, one is the random scission of the chains, resulting in the reduction of the molecular weight of the raw polymer, another is the C—C bond chain end scission, resulting in the production of volatile products. The reaction of these two pathways occurs simultaneously, causing the polymer molecule to split into one with an unsaturated terminal and another with a terminal free radical.

The pyrolysis mechanisms of hydrocarbons have long been studied, and they occur through free radical mechanisms, which include initiation, propagation, and termination reactions.

$$R—R' \rightarrow R \cdot + R \cdot'$$ The initiation reactions:

The propagation reactions:

$$R \cdot + R' \rightarrow R + R \cdot'$$ (1) Hydrogen abstraction reactions:

$$R \cdot + R' = R'' \leftarrow \rightarrow R—R'—R''$$ (2) Radical addition:

$$\cdot R—R'—R''—R''' \leftarrow \rightarrow R—R'—R''—R'''$$ (3) Radical isomerization reactions:

$$R + R' \rightarrow R—R'$$ The chain termination reactions:

Most views support that the pyrolysis of polyethylene mainly occurs through random chain scission and its degradation is carried out by free radical mechanism. One previous study that studied the high-pressure pyrolysis of LDPE believed that with the initiation of free radical reaction triggered by random chain scission, this process was accompanied by further chain scission, unsaturation, recombination, isomerization, cyclization, diene synthesis, and other secondary reactions. These reactions are initiated by random collisions of free radicals. Therefore, due to the free radicals entering the gas phase, the free radical reaction is weak, most of the products are retained in straight-chain alkanes and alkenes, and a small amount of free radical cyclization occurs to generate cycloalkanes. Pyrolysis of free radicals is more focused on the high-pressure liquid system, increasing the chance of a collision between molecules. Frequent collisions will aggravate the cyclization reaction and trigger the aromatization, and that produces aromatics and more cycloalkanes. He plotted the pyrolysis pathway of LDPE through the analysis of pyrolysis products and the reaction mechanism of free radicals. Wan-ting Chen plotted the hydrothermal reaction pathways of polypropylene, and refined the radical reactions into depolymerization, cracking, hydrogenation, cyclization, aromatization, gasification, and dehydrogenation.

Combined with Table 4 and Table 5, 34.71% of straight-chain alkanes and 44.25% of straight-chain alkenes in acetone STL oil come from random scission pathways, while 5.74% of branched-chain alkanes mainly come from isomerization reactions and a small part from random shear of branched network structures of LLDPE and XLPE, 4.66% of cycloalkanes were derived from the cyclization of radical intermediates, 6.46% of aromatic compounds from radical recombination and aromatization, and 4.16% of cyclene from radical recombination. The results of solvothermal liquefaction of methanol are the same as those of acetone, and they have a similar distribution of oil products. But milder conditions were used in this study, which made the main reaction of the random-chain pathway more prominent and attenuated the other side reactions. This is beneficial to the quality of oil products. One previous study obtained the hydrothermal liquefaction reaction pathway of LLDPE from a supercritical water liquefaction study of LLDPE and PP. The hydrothermal liquefaction reaction pathway summarized by that study is consistent with the present study, but it is cannot explain the generation of carboxylic acid in the HTL experimental group. These carboxylic acids may be derived from the hydrothermal products of the oxidized portion of waste polyethylene. Therefore, the solvent liquefaction pathway of LLDPE and XLPE mixtures needs more sufficient data to be improved.

Figure 12:
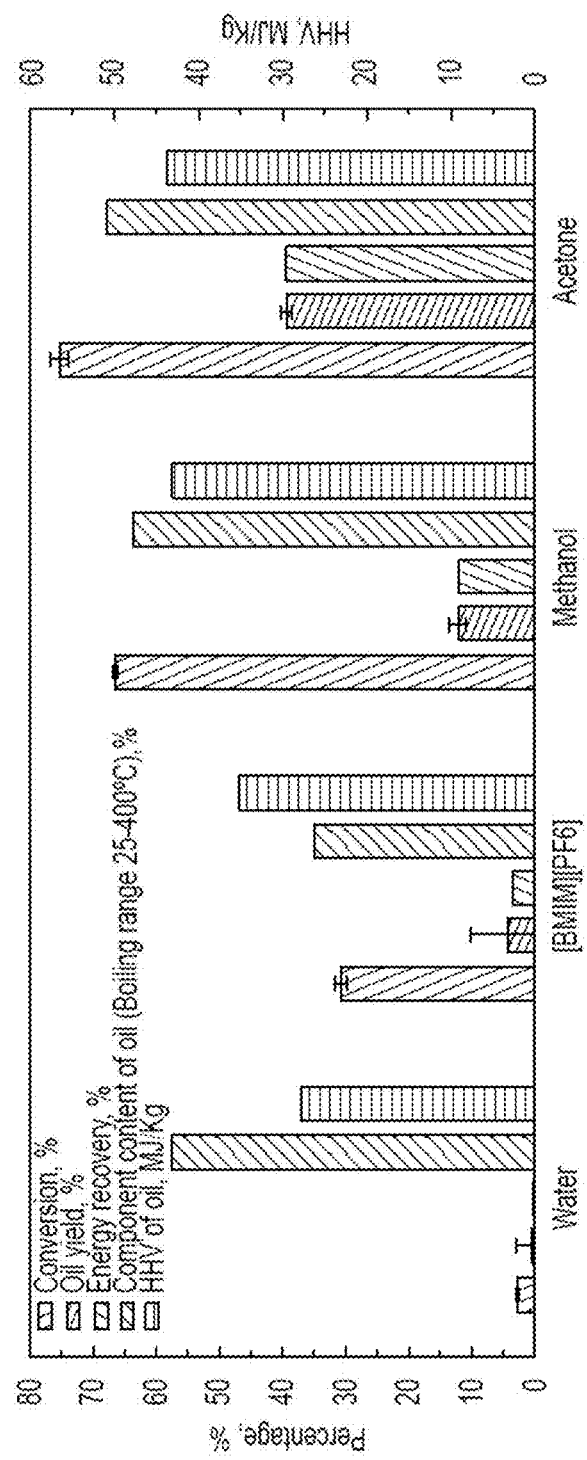
FIG. 12 is a graph showing a comprehensive evaluation of SRP plastic thermal liquefaction in different solvents (350° C., 90 min) and the crude oil content.

FIG. 12 summarizes the analysis of the quality of crude oil products obtained by thermal liquefaction in different solvent types, including reaction conversion, oil production rate, the heat value of oil, energy recovery of oil, and the low boiling point component distribution of oil. From the figure, acetone STL has the best thermal liquefaction effect on LLDPE and XLPE mixed materials.

Figure 11:
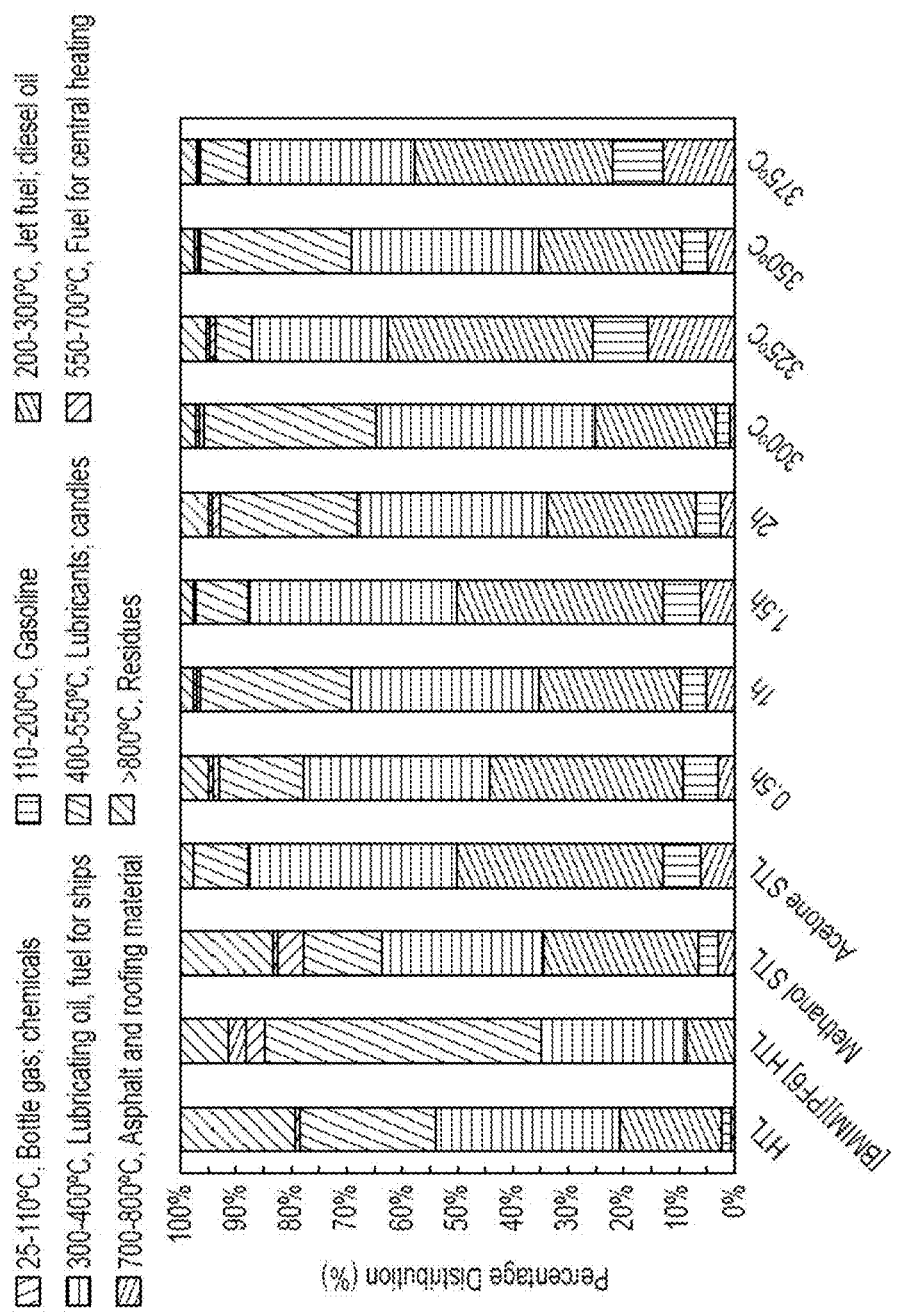
FIG. 11 is a graph showing the boiling point distribution of crude oil obtained from SRP plastic thermal liquefaction with different solvent types (350° C., 90 min), varying temperatures (300-375° C., 60 min), and varying residence (reaction) times (350° C., 30-120 min).

LLDPE and XLPE have better thermal stability than ordinary polyethylene, making the decomposition conditions more demanding. In this study, different solvents were used to explore the thermal liquefaction reaction of LLDPE and XLPE mixed materials. The reaction conditions were explored, by comparing the reaction conversion (%), oil yields, calorific value, energy recovery rate, and low molecular weight component content of oil (FIG. 11). The results show that acetone STL at 350° C. for 90 min has the best performance on the thermal liquefaction of polyethylene. The gas composition produced by acetone STL of polyethylene is also a valuable fuel gas, so the subsequent in-depth analysis of it has high research value. Meanwhile, the application of organic solvent in waste plastics gasification also has good research and development prospects.

The thermogravimetric analysis method can be a good simulation of the crude distillation process, in which industrial valorization guidance information of crude oil can be obtained by dividing the boiling range of components. polyethylene liquefied oil has a high content of low boiling point hydrocarbon chain distribution. This is due to the more moderate reaction conditions the content of aromatic components is at a low level, there is no complex cyclization aromatization reaction in the reaction, and the nitrogen and oxygen content is low. These properties make the physical and chemical properties of polyethylene liquefied oil have a better quality than petroleum crude oil. Polyethylene liquefied oil is expected to be a high-quality substitute for petroleum crude oil and a source of platform compounds. The existing crude oil processing equipment is fully satisfied with the refining of the oil.

The thermal degradation temperature of polyethylene is notably reduced by the solvation of the sample in the thermal liquefaction system. In the solvothermal liquefaction, thermal cracking plays a dominant role in the two reactions of thermal cracking and the solvolysis process, and the solvolysis reaction level is low. The random scission pathway plays a dominant role in the feedstock degradation process.

Because the solvation plays a decisive role in the solvent thermal liquefaction reactions, through the polarity analysis of the sample, the solvent can be target matched. It is necessary to carry out the work of the establishment of the dipole moment database of the solvents, and the model fitting and experimental verification of the dielectric constant with other parameters such as temperature in the next step. This can guide the selection of solvent and reaction temperature, which will greatly promote the development of thermal liquefaction technology.

It is understood that the foregoing detailed description and accompanying examples are merely illustrative and are not to be taken as limitations upon the scope of the disclosure. Various changes and modifications to the disclosed embodiments will be apparent to those skilled in the art. Such changes and modifications, including without limitation those relating to the chemical structures, substituents, derivatives, intermediates, syntheses, compositions, formulations, or methods of use, may be made without departing from the spirit and scope of the disclosure.

What is claimed is:

1. A method for depolymerizing a polyethylene-based plastic, the method comprising:
   combining the polyethylene-based plastic with a solvent in a reactor to generate a plastic solvent mixture;
   heating the plastic solvent mixture in the reactor at a temperature no greater than 360° C. for no less than 70 minutes and no greater than 120 minutes; and
   fractionating the plastic solvent mixture into a gas phase product, a solid phase product, and a liquid phase product wherein the plastic solvent mixture is further combined with an ionic liquid catalyst prior to heating with.

2. The method according to claim 1, wherein the solvent comprises at least one of water, methanol, ethanol, butanol, isopropyl alcohol, or acetone.

3. The method according to claim 2, wherein the solvent comprises acetone.

4. The method according to claim 1, wherein the ionic liquid catalyst comprises 1-butyl-3-methylimidazolium, bis[(perfluoroethyl)sulfonyl]-imide ([BMIM][PF2]), 1-butyl-3-methylimidazolium tetrafluoroborate ([BMIM][BF4]), 1-butyl-3-methylimidazolium hexafluorophosphate ([BMIM][PF6]), or combinations thereof.

5. The method according to claim 1, wherein the heating is performed at about 300° C. to 360° C.

6. The method according to claim 5, wherein the heating is performed between about 340° C. to 360° C.

7. The method according to claim 1, wherein the heating is performed at a pressure of about 2 megapascals to about 20 megapascals.

8. The method according to claim 7, wherein the heating is performed at a pressure of about 8 megapascals to about 11 megapascals.

9. The method according to claim 1, wherein the heating is performed for about 80 minutes to about 100 minutes.

10. The method according to claim 1, wherein the plastic solvent mixture is combined in a weight/volume ratio of about 1 gram plastic:6 mL solvent to about 1 gram plastic:20 mL solvent.

11. The method according to claim 1, further comprising separating the gas phase product and the liquid phase product using a combined membrane and adsorption process.

12. The method according to claim 1, wherein at least 60% of the polyethylene-based plastic is converted into the gas phase product and the liquid phase product.

13. The method according to claim 1, wherein at least 30% of the polyethylene-based plastic is converted into the liquid phase product.

14. The method according to claim 1, wherein the liquid phase product has an oxygen/carbon ratio of about 0.01 to about 0.70.

15. The method according to claim 1, wherein the liquid phase product has a hydrogen/carbon ratio of about 1.4 to about 2.0.

16. The method according to claim 1, wherein the liquid phase product has a high heat value of about 35 MJ/kg to about 45 MJ/kg.

17. A method for depolymerizing a polyethylene-based plastic, the method comprising:
    combining the polyethylene-based plastic with a solvent comprising acetone in a reactor to generate a plastic solvent mixture;
    heating the plastic solvent mixture in the reactor at a temperature no greater than 360° C., at a pressure greater than 2 megapascals, and for no less than 70 minutes and no greater than 120 minutes;
    fractionating the plastic solvent mixture into a gas phase product, a solid phase product, and a liquid phase product; and
    separating the gas phase product and the liquid phase product using a combined membrane and adsorption process.

18. A method for depolymerizing a polyethylene-based plastic, the method comprising:
    combining the polyethylene-based plastic with a solvent comprising acetone in a reactor to generate a plastic solvent mixture;
    heating the plastic solvent mixture in the reactor at a temperature no greater than 360° C. for no less than 70 minutes and no greater than 120 minutes; and
    fractionating the plastic solvent mixture into a gas phase product, a solid phase product, and a liquid phase product.

* * * * *